(12) United States Patent
Ouderkirk et al.

(10) Patent No.: US 7,386,212 B2
(45) Date of Patent: Jun. 10, 2008

(54) POLYMER PHOTONIC CRYSTAL FIBERS

(75) Inventors: Andrew J. Ouderkirk, Woodbury, MN (US); Olester Benson, Jr., Woodbury, MN (US); Robert L. Brott, Woodbury, MN (US); Patrick R. Fleming, Lake Elmo, MN (US); Catherine A. Leatherdale, St. Paul, MN (US); Terence D. Neavin, St. Paul, MN (US); Diane North, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 226 days.

(21) Appl. No.: 11/067,848

(22) Filed: Feb. 28, 2005

(65) Prior Publication Data
US 2006/0194046 A1   Aug. 31, 2006

(51) Int. Cl.
*G02B 6/02*   (2006.01)
(52) U.S. Cl. ............... 385/127; 385/126; 385/123
(58) Field of Classification Search ............... 385/123, 385/126–127
See application file for complete search history.

(56) References Cited

U.S. PATENT DOCUMENTS

| | | | |
|---|---|---|---|
| 2,403,731 | A | 7/1946 | MacNeille |
| 2,604,817 | A | 7/1952 | Schupp, Jr. |
| 2,687,673 | A | 8/1954 | Boone |
| 4,019,844 | A | 4/1977 | Ogasawara et al. |
| 4,357,389 | A | 11/1982 | Satoh et al. |
| 4,477,522 | A | 10/1984 | Sheehan |
| 4,560,411 | A | 12/1985 | Melchior |
| 4,963,151 | A | 10/1990 | Ducheyne et al. |
| 5,047,288 | A | 9/1991 | Hoshiro et al. |
| 5,059,482 | A | 10/1991 | Kawamoto et al. |

(Continued)

FOREIGN PATENT DOCUMENTS

JP   5-113606   5/1993

(Continued)

OTHER PUBLICATIONS

T. F. Cook, "Bicomponent Fibers", Handbook of Fiber Science and Technology: vol. 3, High Technology Fibers, Part D, Marcel Dekker, Inc., ISBN 0-8247-9470-2, 1996, pp. 247-280.

(Continued)

*Primary Examiner*—K. Cyrus Kianni
(74) *Attorney, Agent, or Firm*—Jay R. Pralle

(57) ABSTRACT

A composite polymer fiber comprises a polymer filler material and a plurality of polymer scattering fibers disposed within the filler material. At least one of the filler material and the scattering fibers is formed of a birefringent material. The refractive indices of the filler material and the scattering fibers can be substantially matched for light incident in a first polarization state on the composite polymer fiber and unmatched for light incident in an orthogonal polarization state. The scattering fibers may be arranged to form a photonic crystal within the composite fiber. The composite fibers may be extruded and may be formed into a yarn, a weave or the like. If the filler material is soluble, it may be washed out of the yarn or weave, and the scattering fibers may then be infiltrated with a resin that is subsequently cured.

11 Claims, 16 Drawing Sheets

U.S. PATENT DOCUMENTS

| | | | |
|---|---|---|---|
| 5,217,794 | A | 6/1993 | Schrenk |
| 5,251,065 | A | 10/1993 | Uetsuki |
| 5,269,995 | A | 12/1993 | Ramanathan et al. |
| 5,316,703 | A | 5/1994 | Schrenk |
| 5,389,324 | A | 2/1995 | Lewis et al. |
| 5,444,570 | A | 8/1995 | Uetsuki |
| 5,612,820 | A | 3/1997 | Schrenk et al. |
| 5,629,055 | A | 5/1997 | Revol et al. |
| 5,751,388 | A | 5/1998 | Larson |
| 5,753,277 | A | 5/1998 | Kikutani et al. |
| 5,783,120 | A | 7/1998 | Ouderkirk et al. |
| 5,807,458 | A | 9/1998 | Sanders et al. |
| 5,825,543 | A | 10/1998 | Ouderkirk et al. |
| 5,877,829 | A | 3/1999 | Okamoto et al. |
| 5,882,774 | A | 3/1999 | Jonza et al. |
| 5,999,239 | A | 12/1999 | Larson |
| 6,075,915 | A | 6/2000 | Koops |
| 6,111,696 | A | 8/2000 | Allen et al. |
| 6,139,626 | A * | 10/2000 | Norris et al. ............... 428/323 |
| 6,141,149 | A | 10/2000 | Carlson et al. |
| 6,239,907 | B1 | 5/2001 | Allen et al. |
| 6,243,521 | B1 | 6/2001 | Owaki et al. |
| 6,301,421 | B1 | 10/2001 | Wickham et al. |
| 6,310,671 | B1 | 10/2001 | Larson |
| 6,326,094 | B1 | 12/2001 | Asano et al. |
| 6,335,094 | B1 | 1/2002 | Owaki et al. |
| 6,387,488 | B1 | 5/2002 | Kumazawa et al. |
| 6,430,348 | B1 | 8/2002 | Asano et al. |
| 6,433,919 | B1 | 8/2002 | Chowdhury et al. |
| 6,498,869 | B1 | 12/2002 | Yao |
| 6,529,676 | B2 | 3/2003 | Eggleton et al. |
| 6,542,681 | B2 * | 4/2003 | Broeng et al. ............... 385/123 |
| 6,542,682 | B2 | 4/2003 | Cotteverte et al. |
| 6,577,446 | B2 | 6/2003 | Kumazawa et al. |
| 6,674,949 | B2 | 1/2004 | Allan et al. |
| 6,813,399 | B2 | 11/2004 | Hamada |
| 6,876,796 | B2 * | 4/2005 | Garito et al. ................. 385/50 |
| 7,082,147 | B2 * | 7/2006 | Spoonhower et al. ...... 372/50.1 |
| 2001/0012149 | A1 | 8/2001 | Lin et al. |
| 2002/0130988 | A1 | 9/2002 | Crawford et al. |
| 2002/0131737 | A1 * | 9/2002 | Broeng et al. ............... 385/123 |
| 2002/0135880 | A1 | 9/2002 | Fink et al. |
| 2002/0154403 | A1 | 10/2002 | Trotter, Jr. |
| 2002/0155592 | A1 | 10/2002 | Kelleher et al. |
| 2002/0181911 | A1 | 12/2002 | Wadsworth et al. |
| 2003/0031438 | A1 * | 2/2003 | Kambe et al. ............... 385/122 |
| 2003/0031846 | A1 | 2/2003 | Kumazawa et al. |
| 2003/0035972 | A1 | 2/2003 | Hanson et al. |
| 2003/0218704 | A1 | 11/2003 | Lee et al. |
| 2004/0012118 | A1 | 1/2004 | Perez et al. |
| 2004/0012855 | A1 | 1/2004 | Allen et al. |
| 2004/0031435 | A1 | 2/2004 | Park |
| 2004/0052484 | A1 | 3/2004 | Broeng et al. |
| 2004/0096172 | A1 | 5/2004 | Bongrand et al. |
| 2004/0126592 | A1 | 7/2004 | Shibahara et al. |
| 2004/0132867 | A1 | 7/2004 | Shibahara et al. |
| 2004/0175084 | A1 | 9/2004 | Broeng et al. |
| 2004/0179803 | A1 | 9/2004 | Bourelle |
| 2004/0223715 | A1 | 11/2004 | Benoit et al. |
| 2005/0147366 | A1 | 7/2005 | Large et al. |
| 2005/0201655 | A1 | 9/2005 | Ellwood, Jr. |
| 2005/0201715 | A1 | 9/2005 | Ellwood, Jr. |
| 2006/0029343 | A1 * | 2/2006 | Farroni et al. ............... 385/123 |
| 2006/0139948 | A1 | 6/2006 | Huck et al. |
| 2006/0193593 | A1 | 8/2006 | Ouderkirk et al. |
| 2007/0042168 | A1 | 2/2007 | Harada et al. |

FOREIGN PATENT DOCUMENTS

| | | |
|---|---|---|
| JP | 09311205 | 2/1997 |
| JP | 2000-52399 | 2/2000 |
| JP | 2000239541 | 9/2000 |
| JP | 2001031774 | 2/2001 |
| JP | 2005-133028 | 5/2005 |
| WO | WO 97/32224 | 9/1997 |
| WO | WO9732224 * | 9/1997 |
| WO | WO 99/64904 | 12/1999 |
| WO | WO9964904 * | 12/1999 |
| WO | WO 02/48757 | 6/2002 |
| WO | WO 03/062909 | 7/2003 |
| WO | WO 2004/046777 | 6/2004 |
| WO | WO 2004046777 A1 * | 6/2004 |

OTHER PUBLICATIONS

A. Paul, *Chemistry of Glasses*, 2$^{nd}$ Edition, Chapman and Hall, 1990, pp. 41-49.

W.D. Kingery, et al., Massachusetts Institute of Technology, *Introduction to Ceramics*, 2$^{nd}$ Edition, John Wiley and Sons, 1976, pp. 368-374.

Dugan et al., "Synthetic Split Microfiber Technology for Filtration", Fiber Innovation Technologies and Edward C. Homonoff & Associates, LLC, Filtration 2000 Conference, Philadelphia, PA, Nov. 2000, 9 pgs.

"King and Company—Glossary of Fabric and Textile Jargon" <http://www.kingandco.com/glossary/>, printed from internet on Oct. 1, 2003, 6 pgs.

The Texemart Times, "Texemart News—Features Section, Recent Advancements in Man-made Textiles: Microfibres", <http://www.texemart.com/news/narchive/archivedec5.asp>, Printed from the internet on Oct. 1, 2003, p. 3.

Hagewood et al., Hill Inc., Barrier Fabrics of Spunbond Specialty Fibers for Medica . . . , "Production of Sub-micron Fibers in Non-Woven Fabric", <http://www.hillsinc.net/submicron%20.shtml>, printed from the internet on Oct. 1, 2003, p. 7.

Ouderkirk et al., U.S. Appl. No. 11/068,157, "Reflective Polarizers Containing Polymer Fibers", filed Feb. 28, 2005.

Fleming et al., U.S. Appl. No. 11/068,158, "Composite Polymer Fibers", filed Feb. 28, 2005.

Neavin et al., U.S. Appl. No. 11/068,159, "Composite Polymeric Optical Films With Co-Continuous Phases", filed Feb. 28, 2005.

Ouderkirk et al., U.S. Appl. No. 11/068,590, "Optical Elements Containing a Polymer Fiber Weave", filed Feb. 28, 2005.

Fleming et al., U.S. Appl. No. 11/067,848, "Polymer Photonic Crystal Fibers", filed Feb. 28, 2005.

Jonza et al., "Multilayer Polymeric Color-shifting Polarizer Films", Optical Security and Counterfeit Deterrence Techniques V, Proceedings of SPIE-IS&T Electronic Imaging, SPIE vol. 5310, 2004.

Li et al., "In-Situ Microfibrillar PET/iPP Blend via Slit Die Extrusion, Hot Stretching, and Quenching: Influence of Hot Stretch Ratio on Morphology, Crystallization, and Crystal Structure of iPP at a Fixed PET Concentration", Journal of Polymer Science: Polymer Physics, vol. 42, pp. 4095-4106, 2004.

Weber et al., "Giant Birefringent Optics in Multilayer Polymer Mirrors", Science, vol. 287, Mar. 31, 2000.

* cited by examiner

POLYMER PHOTONIC CRYSTAL FIBERS

Related Applications

This application is related to co-owned U.S. Patent Publication No. 2006/0193577 titled "REFLECTIVE POLARIZERS CONTAINING POLYMER FIBERS", filed on even date herewith; U.S. Patent Publication No. 2006/0193582 titled "COMPOSITE POLYMER FIBERS", filed on even date herewith; U.S. Patent Publication No. 2006/0193578 titled "COMPOSITE POLYMERIC OPTICAL FILMS WITH CO-CONTINUOUS PHASES", filed on even date herewith; U.S. Patent Publication No. 2006/0194487 titled "OPTICAL ELEMENTS CONTAINING A POLYMER FIBER WEAVE", filed on even date herewith; and, U.S. Patent Publication No. 2006/0196593 titled "POLYMERIC PHOTONIC CRYSTALS WITH CO-CONTINUOUS PHASES", filed on even date herewith, all of which are incorporated herein by reference.

FIELD OF THE INVENTION

The invention relates to polymer fibers, and more particularly to "island in the sea" polymer fibers formed using at least one birefringent polymer material.

BACKGROUND

Photonic crystal devices provide potential for controlling light in various configurations. For example, photonic crystal fibers have been formed by configuring a glass fiber with a series of longitudinal holes arranged in a specific pattern that provides confinement to light propagating along the fiber.

Photonic crystal devices have not yet, however, experienced significant penetration into the marketplace. One of the reasons for this is the difficulty in fabricating photonic crystal fibers, which makes these devices expensive.

SUMMARY OF THE INVENTION

One embodiment of the present invention is directed to a photonic crystal fiber device that includes a composite polymer fiber having polymer scattering fibers disposed within a polymer filler. The polymer scattering fibers have a refractive index different from a refractive index of the polymer filler. The scattering fibers are arranged in cross-section across the polymer fiber in a photonic crystal arrangement selected to provide desired spectral effects for light incident laterally on the composite polymer fiber.

Another embodiment of the invention is directed to a photonic crystal fiber device that includes a polymer matrix and composite polymer fibers disposed in the polymer matrix. The composite polymer fibers comprise polymer scattering fibers disposed within a polymer filler. The polymer scattering fibers have a refractive index different from a refractive index of the polymer filler. The scattering fibers in at least one composite fiber are arranged in cross-section across the at least one composite fiber in a photonic crystal arrangement selected to provide desired spectral effects for light incident laterally on the at least one composite fiber.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
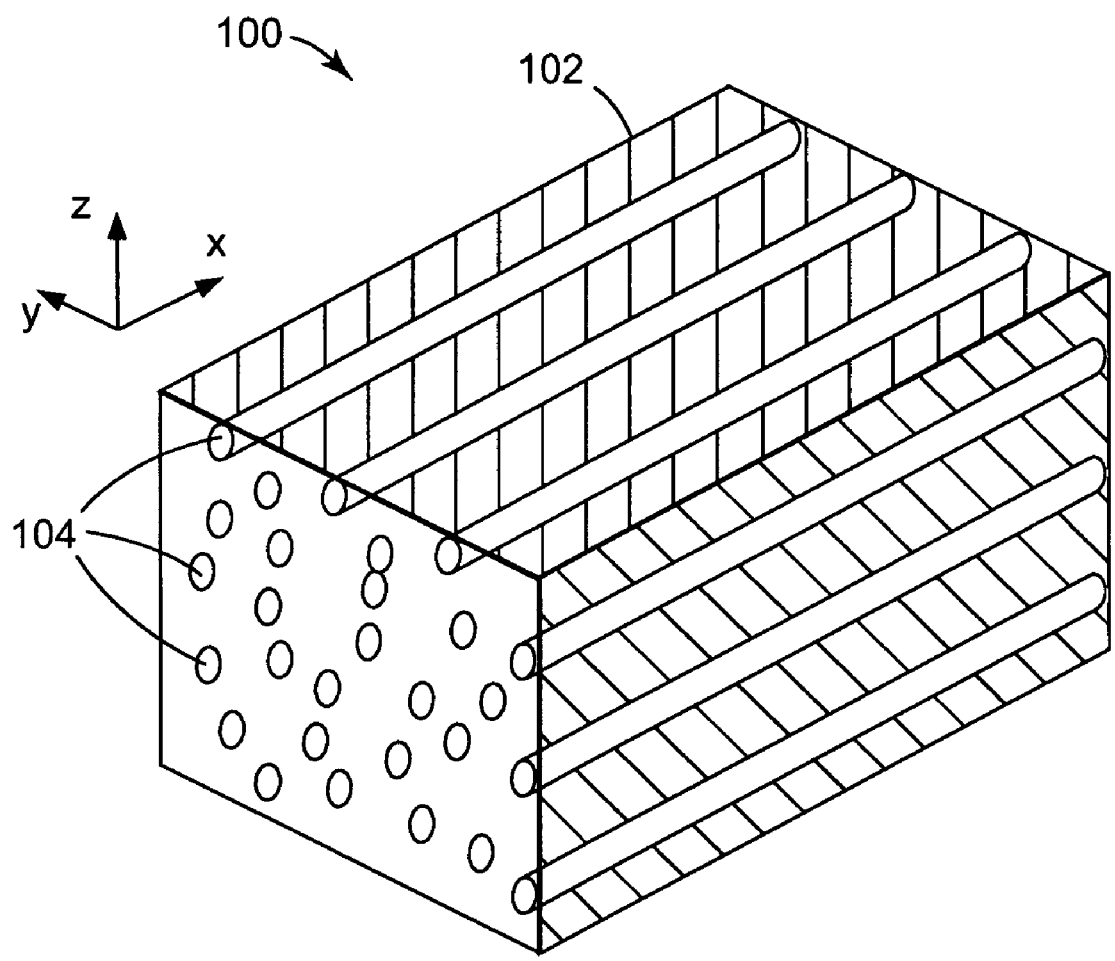
FIG. 1 schematically illustrates an optical element that contains polymer fibers according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical systems and is more particularly applicable to systems that control and use polarized light. The present invention is directed to products that may incorporate a photonic crystal structure within a device fabricated primarily from polymeric materials. The use of polymers permits the arrangement of "islands" of one particular type of polymer material with a "sea" of another type of polymer material, sometimes referred to as an "islands in the sea" structure, that forms a fiber. Furthermore, the use of polymers permits the co-extrusion of the "islands in the sea" fiber where shape and the positions of the islands are closely controlled. Such control over the "islands in the sea" fiber permits the relatively inexpensive fabrication of two dimensional, photonic crystalline structures. In addition, if at least one of the polymeric materials is birefringent, the fiber becomes sensitive to the polarization of the incident light. Multiple two-dimensional photonic crystal structures may be arranged together, for example arranged in a mat or encapsulated within a film, and illuminated transversely, so that the incident light experiences large-area photonic crystal effects that are the convoluted behaviors of each fiber.

Devices using the fibers of the present invention may be illuminated transversely, rather than along the axis of the fiber, which may lead to the easing of restrictions often considered to be associated with photonic crystal devices. For example, when a photonic crystal fiber is used for guiding light longitudinally, the fiber has to be fabricated out of low loss optical materials, otherwise the optical throughput is low. When a photonic crystal fiber is illuminated transversely, on the other hand, higher loss materials may be used since the path length is relatively short.

In many applications, substantial refractive index ratio is needed to exhibit two-dimensional photonic band gap effects, for example, a ratio of 1.0 to 2.6. However, where the wavelength range and the angle of incidence range are more limited the requirements on the refractive index ratio are less stringent, and smaller refractive index differences may be used. However, the use of birefringent polymeric materials permits the refractive index contrast to be significantly higher for one selected polarization state, for example the refractive index difference may be in the range 0.01-0.4. Consequently, optical effects may be seen for one polarization state, without significantly impacting the other polarization state, over a relatively wide range of wavelength and angle of incidence.

As used herein, the terms "specular reflection" and "specular reflectance" refer to the reflectance of light rays from a body where the angle of reflection is equal to the angle of incidence, where the angles are measured relative to a normal to the body's surface. In other words, when the light is incident on the body with a particular angular distribution, the reflected light has substantially the same angular distribution. The terms "diffuse reflection" or "diffuse reflectance" refer to the reflection of rays where the angle of some of the reflected light is not equal to the angle of incidence. Consequently, when light is incident on the body with a particular angular distribution, the angular distribution of the reflected light is different from that of the incident light. The terms "total reflectance" or "total reflection" refer to the combined reflectance of all light, specular and diffuse.

Similarly, the terms "specular transmission" and "specular transmittance" are used herein in reference to the transmission of light through a body where the angular distribution of the transmitted light is substantially the same as that of the incident light. The terms "diffuse transmission" and "diffuse transmittance" are used to describe the transmission of light through a body, where the transmitted light has an angular distribution that is different from the angular distribution of the incident light. The terms "total transmission" or "total transmittance" refer to the combined transmission of all light, specular and diffuse.

A cut-away view through an optical element 100 according to an exemplary embodiment of the present invention is schematically presented in FIG. 1. The optical element 100 comprises a polymer matrix 102, also referred to as a continuous phase. The polymer matrix may be optically isotropic or optically birefringent. For example, the polymer matrix may be uniaxially or biaxially birefringent, meaning that the refractive index of the polymer may be different along one direction and similar in two orthogonal directions (uniaxial) or different in all three orthogonal directions (biaxial). Composite polymer fibers 104 are disposed within the matrix 102. The composite polymer fibers 104 comprise at least two materials.

The polymer fibers 104 may be organized within the matrix 102 as single fibers, as illustrated, or in many other arrangements. Some exemplary arrangements include yarns, a tow (of fibers or yarns) arranged in one direction within the polymer matrix, a weave, a non-woven, chopped fiber, a chopped fiber mat (with random or ordered formats), or combinations of these formats. The chopped fiber mat or nonwoven may be stretched, stressed, or oriented to provide some alignment of the fibers within the nonwoven or chopped fiber mat, rather than having a random arrangement of fibers.

Right-handed Cartesian coordinates have been adopted in FIG. 1, with the fibers 104 being positioned approximately parallel to the x-axis. The following discussion also assumes that the longitudinal axis of the fiber is parallel to the x-axis, although it will be appreciated that such a designation is arbitrary and made only to aid in the explanation of the invention.

Figure 2A:
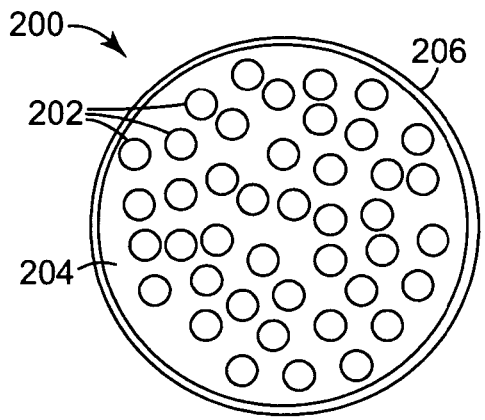
FIGS. 2A-2K schematically illustrate cross-sectional views of various embodiments of composite fiber according to principles of the present invention.

One exemplary embodiment of a composite fiber 200 is shown in cross-section in FIG. 2A. The composite fiber 200 comprises a number of scattering fibers 202 contained within a filler 204. In some embodiments, at least one of the scattering fibers 202 or the filler 204 is birefringent. For example, in some exemplary embodiments, at least some of the scattering fibers 202 are formed of a birefringent material and the filler material 204 is non-birefringent. In other exemplary embodiments, the scattering fibers 202 are non-birefringent while the filler material 204 is birefringent. In other embodiments, both the scattering fibers 202 and the filler 204 are birefringent. In these different variations, each interface between the material of a scattering fiber 202 and the filler material 204 is an interface between birefringent material and another material, i.e., is a birefringent interface, and can contribute to the preferential reflection and/or scattering of light in a selected polarization state. In each of these different embodiments, the polymer matrix, in which the composite fiber is embedded, may be optically isotropic or birefringent.

In some other embodiments, the composite fibers 200 may be made from isotropic scattering fibers 202 with an isotropic filler material 204. The matrix in which the composite fibers 200 are embedded may be birefringent.

The refractive indices in the x-, y-, and z-directions for the scattering fiber material may be referred to as $n_{1x}$, $n_{1y}$ and $n_{1z}$, and the refractive indices in the x-, y-, and z-directions for the filler material may be referred to as $n_{2x}$, $n_{2y}$ and $n_{2z}$.

Where the material is isotropic, the x-, y-, and z-refractive indices are all substantially matched. Where the material is birefringent, at least one of the x-, y- and z-refractive indices is different from the others. In uniaxial materials, two of the refractive indices are substantially matched, while the third is different. In a biaxial material, all three refractive indices are different.

There are multiple interfaces within each composite fiber 200 between the scattering fibers 202 and the filler 204. Where at least one of the materials forming the interface between the scattering fibers 202 and the filler 204 is birefringent, the interface may be referred to as being a birefringent interface. For example, if a scattering fiber 202 and the filler 204 present their x- and y-refractive indices at the interface refractive index, and $n_{1x} \neq n_{1y}$, i.e., the scattering fiber material is birefringent, then the interface is birefringent.

The composite fibers 104 are disposed generally parallel to an axis, illustrated as the x-axis in FIG. 1. The refractive index difference at the birefringent interfaces within the composite fibers 104 for light polarized parallel to the x-axis, $n_{1x}-n_{2x}$, may be different from the refractive index difference for light polarized parallel to the y-axis, $n_{1y}-n_{2y}$. Thus, for one polarization state, the refractive index difference at the birefringent interfaces in the composite fibers 104 is relatively small. In some exemplary cases, the refractive index difference may be less than about 0.05, or may be less than 0.03, less than 0.02, or less than 0.01. This condition is considered to be substantially index-matched. If this polarization direction is parallel to the x-axis, then x-polarized light passes through the body 100 with little or no reflection or scattering. In other words, x-polarized light is highly transmitted through the body 100.

On the other hand, the refractive index difference at the birefringent interfaces in the composite fibers 104 may be relatively high for light in the orthogonal polarization state. In some exemplary examples, the refractive index difference may be at least about 0.05, and may be greater, for example 0.1, or 0.15 or may be 0.2. If this polarization direction is parallel to the y-axis, then y-polarized light is reflected at the birefringent interfaces. Thus, y-polarized light is reflected by the body 100. If the birefringent interfaces within the composite fibers 104 are substantially parallel to each other, then the reflection may be essentially specular. If, on the other hand, the birefringent interfaces within the composite fibers 104 are not substantially parallel to each other, then the reflection may be substantially diffuse. Some of the birefringent interfaces may be parallel, and other interfaces may be non-parallel, which may lead to the reflected light containing both specular and diffuse components. Also, a birefringent interface may be curved, or relatively small, which may lead to diffuse scattering.

While the exemplary embodiment just described is directed to index matching in the x-direction, with a relatively large index difference in the y-direction, other exemplary embodiments include index matching in the y-direction, with a relatively large index difference in the x-direction.

The polymer matrix 102 may be substantially optically isotropic, for example having a birefringence, $n_{3x}-n_{3y}$, of less than 0.05, and preferably less than 0.01, where the refractive indices in the x- and y-directions are $n_{3x}$ and $n_{3y}$ respectively. In other embodiments, the polymer matrix may be birefringent. Consequently, in some embodiments, the refractive index difference between the polymer matrix and either or both of the composite fiber materials may be different for different polarizations. For example, the x-refractive index difference, $n_{1x}-n_{3x}$, may be different from the y-refractive index difference, $n_{1y}-n_{3y}$. In some embodiments, one of these refractive index differences may be at least twice as large as the other refractive index difference.

In some embodiments, the refractive index difference, the extent and shape of the birefringent interfaces, and the relative positions of the scattering fibers may result in diffuse scattering of one of the incident polarizations more than the other polarization. Such scattering may be primarily back-scattering (diffuse reflection) forward-scattering (diffuse transmission) or a combination of both back- and forward-scattering.

Suitable materials for use in the polymer matrix and/or in the fibers include thermoplastic and thermosetting polymers that are transparent over the desired range of light wavelengths. In some embodiments, it is particularly useful that the polymers be non-soluble in water. Further, suitable polymer materials may be amorphous or semi-crystalline, and may include homopolymer, copolymer or blends thereof. Example polymer materials include, but are not limited to, poly(carbonate) (PC); syndiotactic and isotactic poly(styrene) (PS); C1-C8 alkyl styrenes; alkyl, aromatic, and aliphatic ring-containing (meth)acrylates, including poly(methylmethacrylate) (PMMA) and PMMA copolymers; ethoxylated and propoxylated (meth)acrylates; multi-functional (meth)acrylates; acrylated epoxies; epoxies; and other ethylenically unsaturated materials; cyclic olefins and cyclic olefinic copolymers; acrylonitrile butadiene styrene (ABS); styrene acrylonitrile copolymers (SAN); epoxies; poly(vinylcyclohexane); PMMA/poly(vinylfluoride) blends; poly(phenylene oxide) alloys; styrenic block copolymers; polyimide; polysulfone; poly(vinyl chloride); poly (dimethyl siloxane) (PDMS); polyurethanes; unsaturated polyesters; poly(ethylene), including low birefringence polyethylene; poly(propylene) (PP); poly(alkane terephthalates), such as poly(ethylene terephthalate) (PET); poly (alkane naphthalates), such as poly(ethylene naphthalate) (PEN); polyamide; ionomers; vinyl acetate/polyethylene copolymers; cellulose acetate; cellulose acetate butyrate; fluoropolymers; poly(styrene)-poly(ethylene) copolymers; poly(carbonate)/aliphatic PET blends and PET and PEN copolymers, including polyolefinic PET and PEN. The term (meth)acrylate is defined as being either the corresponding methacrylate or acrylate compounds. With the exception of syndiotactic PS, these polymers may be used in an optically isotropic form.

Several of these polymers may become birefringent when oriented. In particular, PET, PEN, and copolymers thereof, and liquid crystal polymers, manifest relatively large values of birefringence when oriented. Polymers may be oriented using different methods, including extrusion and stretching. Stretching is a particularly useful method for orienting a polymer, because it permits a high degree of orientation and may be controlled by a number of easily controllable external parameters, such as temperature and stretch ratio. The refractive indices for a number of exemplary polymers, oriented and unoriented, are provided in Table I below.

TABLE I

Typical Refractive Index Values for Some Polymer Materials

| Resin/Blend | S.R. | T (° C.) | $n_x$ | $n_y$ | $n_z$ |
|---|---|---|---|---|---|
| PEN | 1 | — | 1.64 | | |
| PEN | 6 | 150 | 1.88 | 1.57 | 1.57 |
| PET | 1 | — | 1.57 | | |

TABLE I-continued

Typical Refractive Index Values for Some Polymer Materials

| Resin/Blend | S.R. | T (° C.) | $n_x$ | $n_y$ | $n_z$ |
|---|---|---|---|---|---|
| PET | 6 | 100 | 1.69 | 1.54 | 1.54 |
| CoPEN | 1 | — | 1.57 | | |
| CoPEN | 6 | 135 | 1.82 | 1.56 | 1.56 |
| PMMA | 1 | — | 1.49 | | |
| PC, CoPET blend | 1 | — | 1.56 | | |
| THV | 1 | — | 1.34 | | |
| PETG | 1 | — | 1.56 | | |
| SAN | 1 | — | 1.56 | | |
| PCTG | 1 | — | 1.55 | | |
| PS, PMMA copolymer | 1 | — | 1.55-1.58 | | |
| PP | 1 | — | 1.52 | | |
| Syndiotactic PS | 6 | 130 | 1.57 | 1.61 | 1.61 |

PCTG and PETG (a glycol-modified polyethylene terephthalate) are types of copolyesters available from, for example, Eastman Chemical Co., Kingsport, Tenn., under the Eastar™ brand name. THV is a polymer of tetrafluoroethylene, hexafluoropropylene and vinylidene fluoride, available from 3M Company, St. Paul, Minn., under the brand name Dyneon™. The PS/PMMA copolymer is an example of a copolymer whose refractive index may be "tuned" by changing the ratio of the constituent monomers in the copolymer to achieve a desired value of refractive index. The column labeled "S.R." contains the stretch ratio. A stretch ratio of 1 means that the material is unstretched and, therefore, unoriented. A stretch ratio of 6 means that sample was stretched to six times it original length. If stretched under the correct temperature conditions, the polymeric molecules are oriented and the material becomes birefringent. It is possible, however, to stretch the material above its glass temperature, Tg, without orienting the molecules. The column labeled "T" indicates the temperature at which the sample was stretched. The stretched samples were stretched as sheets. The columns labeled $n_x$, $n_y$ and $n_z$ refer to the refractive indices of the material. Where no value is listed in the table for $n_y$ and $n_z$, the values of $n_y$ and $n_z$ are the same as for $n_x$.

The behavior of the refractive index when stretching a fiber is expected to give results similar to, but not necessarily the same as, those for stretching a sheet. Polymer fibers may be stretched to any desired value that produces desired values of refractive index. For example, some polymer fibers may be stretched to produce a stretch ratio of at least 3, and maybe at least 6. In some embodiments, polymer fibers may be stretched even more, for example to a stretch ratio of up to 20, or even more.

A suitable temperature for stretching to achieve birefringence is approximately 80% of the polymer melting point, expressed in Kelvins. Birefringence may also be induced by stresses induced by flow of the polymer melt experienced during extrusion and film formation processes. Birefringence may also be developed by alignment with adjacent surfaces such as fibers in the film article. Birefringence may either be positive or negative. Positive birefringence is defined as when the direction of the electric field axis for linearly polarized light experiences the highest refractive index when it is parallel to the polymer's orientation or aligning surface. Negative birefringence is defined as when the direction of the electric field axis for linearly polarized light experiences the lowest refractive index when it is parallel to the polymer's orientation or aligning surface. Examples of positively birefringent polymers include PEN and PET. An example of a negatively birefringent polymer includes syndiotactic polystyrene.

The matrix 102 and/or the composite fibers 104 may be provided with various additives to provide desired properties to the optical element. For example, the additives may include one or more of the following: an anti-weathering agent, UV absorbers, a hindered amine light stabilizer, an antioxidant, a dispersant, a lubricant, an anti-static agent, a pigment or dye, a nucleating agent, a flame retardant and a blowing agent. Other additives may be provided for altering the refractive index of the polymer or increasing the strength of the material. Such additives may include, for example, organic additives such as polymeric beads or particles and polymeric nanoparticles, or inorganic additives, such as glass, ceramic or metal-oxide nanoparticles, or milled, powered, bead, flake, fiber or particulate glass, ceramic or glass-ceramic. The surface of these additives may be provided with a binding agent for binding to the polymer. For example, a silane coupling agent may be used with a glass additive to bind the glass additive to the polymer.

In some embodiments, it may be preferable that the matrix 102 or the filler 204 be non-soluble, or at least resistant to solvents. Examples of suitable materials that are solvent resistant include polypropylene, PET and PEN. In other embodiments it may be preferable that the matrix 102 or filler 204 is soluble in an organic solvent. For example, a matrix 102 or filler 204 formed of polystyrene is soluble in an organic solvent such as acetone. In other embodiments, it may be preferable that the matrix is water soluble. For example, a matrix 102 or filler 204 formed of polyvinyl acetate is soluble in water.

The refractive index of the materials in some embodiments of an optical element may vary along the length of the fiber, in the x-direction. For example, the element may not be subject to uniform stretching, but may be stretched to a greater degree in some regions than in others. Consequently, the degree of orientation of the orientable materials is not uniform along the element, and so the birefringence may vary spatially along the element.

Furthermore, the incorporation of fibers within the matrix may improve the mechanical properties of the optical element. In particular, some polymeric materials, such as polyester, are stronger in the form of a fiber than in the form of a film, and so an optical element containing fibers may be stronger than one of similar dimensions that contains no fibers. Furthermore, mechanical property enhancements can be imparted to the element due to the difference in mechanical properties of the matrix material and the fiber material.

Different combinations of polymer material may be used for the scattering fibers, the filler material and the polymer matrix. In one example, the scattering fibers and filler material may both be formed of isotropic materials. The refractive index of the scattering fiber, $n_1$, may be greater or smaller than the refractive index of the filler material. In another example, the scattering fiber may be isotropic and the filler material may be birefringent, for example $n_{2x} \neq n_{2y}$. In such a case, the value of the refractive index of the scattering fiber, $n_1$ may be lower than both $n_{2x}$ and $n_{2y}$, about the same as either $n_{2x}$ and $n_{2y}$, in between $n_{2x}$ and $n_{2y}$, or higher than both $n_{2x}$ and $n_{2y}$. Also, the value of $n_{2x}$ may be greater than the value of $n_{2y}$, or the value of $n_{2x}$ may be less than the value of $n_{2y}$.

In another example, the filler material may be isotropic and the scattering fiber may be birefringent, for example, $n_{1x} \neq n_{1y}$. In such a case, the value of the refractive index of the filler material, $n_2$, may be lower than both $n_{1x}$ and $n_{1y}$, about the same as either $n_{1x}$ and $n_{1y}$, in between $n_{1x}$ and $n_{1y}$, or higher than both $n_{1x}$ and $n_{1y}$. Also, the value of $n_{1x}$ may be greater than the value of $n_{1y}$, or the value of $n_{1x}$ may be less than the value of $n_{1y}$. In another example, both the filler material and the scattering fiber may be birefringent, for example, $n_{1x} \neq n_{1y}$ and $n_{2x} \neq n_{2y}$. In such a case, the value of the refractive indices of the filler material, $n_{2x}$ and $n_{2x}$ may each be lower than both $n_{1x}$ and $n_{1y}$, about the same as either $n_{1x}$ and $n_{1y}$, in between $n_{1x}$ and $n_{1y}$, or higher than both $n_{1x}$ and $n_{1y}$. Furthermore, the value of $n_{1x}$ may be greater than, or less than, the value of $n_{1y}$, and the value of $n_{2x}$ may be greater than, or less than, the value of $n_{2y}$.

The composite fiber can be configured in many different ways. For example, the composite fiber may take on different cross-sectional shapes. In FIG. 2A, the composite fiber 200 has a circular cross-sectional shape. Other exemplary embodiments of composite fibers 210 and 220 in FIGS. 2B and 2C respectively have elliptical and square cross-sectional shapes. Other cross-sectional shapes may be used, for example regular and irregular polygonal shapes, or cross-sectional shapes that combine curved and straight sides, and the intention is not to limit the invention to those cross-sectional shapes shown in the illustrations.

The diameter, or other cross-sectional dimension, of the composite fiber is at least large enough to include two or more scattering fibers. There are no upper limits on the diameter or other cross-sectional dimensions of the composite fiber, however there may be practical limits for the manufacturability of the fiber.

A composite fiber may optionally be provided with an outer layer 206. The outer layer 206 may be used, for example, to affect the adhesion between the composite fiber and the polymer matrix in which the composite fiber is embedded. In some embodiments, the outer layer 206 may be formed of a material that increases the adhesion between the composite fiber and the polymer matrix, for example a polyester resin coating, a silane coating or other primer used for increasing the adhesion between the polymer matrix and the polymer fibers. In other embodiments, the outer layer 206 may be made of a material that reduces the adhesion between the polymer fibers and the surrounding polymer matrix, for example, fluorocarbon materials, silicone materials and the like. In some embodiments, the outer layer 206 may be used to provide an antireflection function, for example by providing some refractive index matching between the filler 204 and the polymer matrix.

Figure 2B:
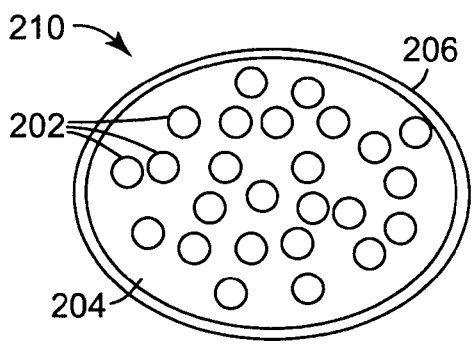
Figure 2C:
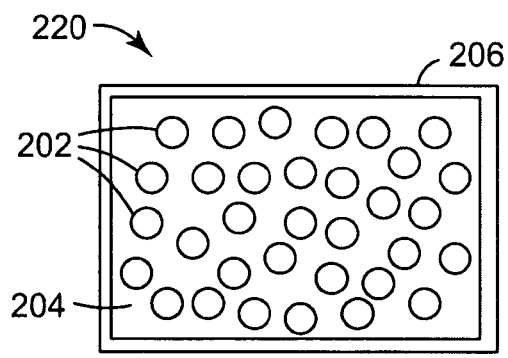
Figure 2D:
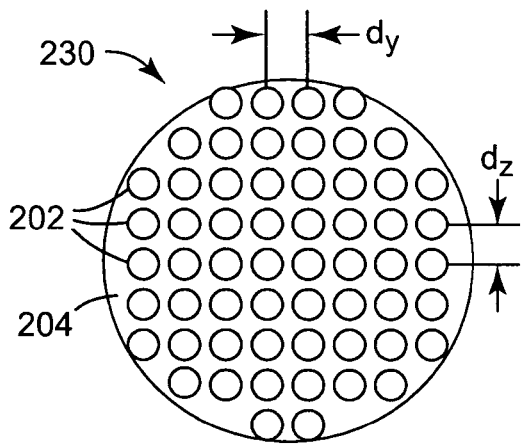

The positions of the scattering fibers 202 may be random within the composite fiber, for example as schematically illustrated in the exemplary embodiments of FIGS. 2A-2C. Other arrangements of the scattering fibers may be employed. For example, the scattering fibers 202 may be regularly arranged within the composite fiber 230, for example as a two-dimensional photonic crystal structure. The exemplary embodiment of fiber 230 illustrated in FIG. 2D shows the scattering fibers 202 arranged in a two dimensional array where the separation distance between adjacent scattering fibers 202 in the y-direction, $d_y$, is the same as the separation distance in the z-direction, $d_z$. Light laterally incident on such a composite fiber 230 demonstrates similar spectral characteristics for light incident along the y- and z-directions.

Figure 2E:
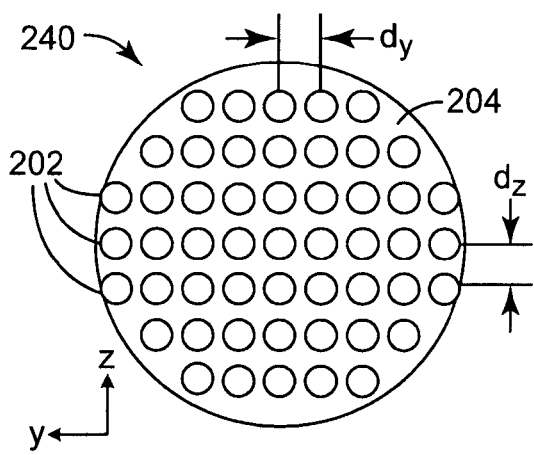

In the exemplary embodiment of composite fiber 240, illustrated in FIG. 2E, the scattering fibers 202 are arranged in a two dimensional array where the separation distance in the y-direction, $d_y$, is different from the separation in the z-direction, $d_z$. Light laterally incident on such a composite fiber 240 demonstrates different spectral characteristics for light incident along the y- and z-directions. More specifically, the greater z-separation will tend to make the wavelength of maximum reflectance longer for light incident along the z-direction than for light incident along the y-direction.

The scattering fibers 202 in FIGS. 2D and 2E lie in a rectangular grid pattern, which is understood to include the square grid pattern of FIG. 2D. The spacing between adjacent scattering fibers 202 may be, for example, in the range 50 nm-500 nm.

Other regular arrangements of the scattering fibers 202 are possible. For example, in the composite fiber 250 schematically illustrated in cross-section in FIG. 2F, the scattering fibers 202 lie in rows along the y-direction where fibers in adjacent rows are offset from each other in the y-direction. In this particular embodiment, the offset between adjacent rows is such that the scattering fibers 202 are arranged in a hexagonal pattern, rather than a square or rectangular pattern. The spectral characteristics, such as transmission and reflectance, are relatively uniform for light laterally incident on the composite fiber 250 in different directions.

Figure 2F:
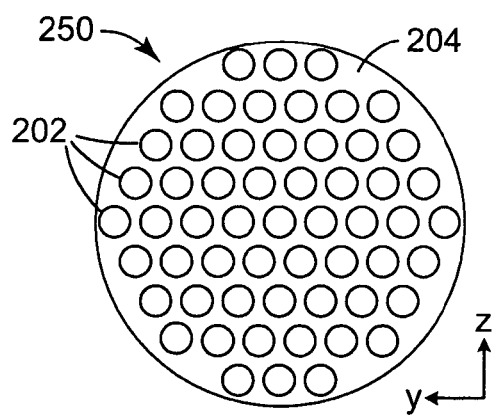
Figure 2G:
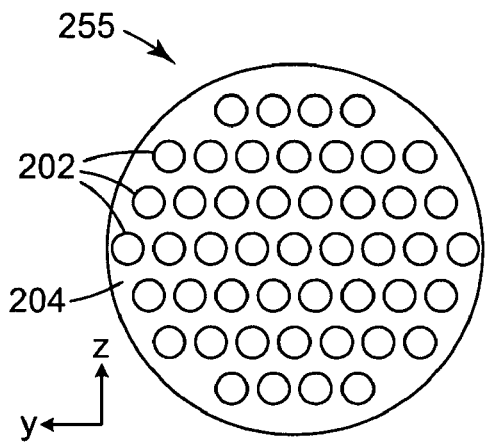

A variation of the arrangement in FIG. 2F is schematically illustrated for composite fiber 255 in FIG. 2G, where the separation between nearest neighbor scattering fibers 202 is greater in one direction than the other, in this particular case greater in the z-direction than in the y-direction. The spectral characteristics are less uniform for light laterally incident on the composite fiber 255 than for composite fiber 250. For example, the greater spacing in the z-direction tends to shift spectral features in the reflectivity and transmission spectra to longer wavelengths.

In other exemplary embodiments, the scattering fibers 202 may form other patterns. For example, the scattering fibers may be arranged so as to fill some, but not all, positions in a regular array. Furthermore, spaces or gaps may be introduced between adjacent scattering fibers or groups of scattering fibers. The size and distribution of such groups or spaces and gaps may be selected to produce particularly desirable spectral characteristics. For example some arrangements of scattering fibers may act as two-dimensional photonic crystals for light within particular wavelength ranges, which may lead to spectrally selective reflection and/or transmission. Two dimensional photonic crystalline structures may exhibit a color shifting effect, where the reflection and/or transmission spectra are dependent on the angle at which light is incident upon the composite fiber. By controlling the size, distribution and indices of refraction of the various regions of the composite fiber, the color-shifting properties can be controlled. Furthermore, a composite fiber allows further control of the color shifting properties as a function of the incidence angle. For example, the color shift may be made to depend on the azimuthal angle of the incident light, in a very different way from the polar angle of the incident light.

Prior studies of photonic crystal fibers (PCF) have concentrated on the use of a periodic arrangement of scattering sites, such as longitudinal holes, surrounding the core of a fiber, for example a glass fiber, to guide light along the fiber. The confinement of light within the fiber core is due to a photonic bandgap that arises from the particular arrangement of holes within the fiber. Asymmetries in the arrangement of holes in the fiber allow the fiber to demonstrate polarization dependent waveguiding properties. It is important to note, however, that these polarization dependent properties do not arise due to birefringence of the material used in the fiber.

Composite fibers of the type disclosed herein, and the type of optical element that may be formed from the composite fibers, differ significantly from the glass fibers used in such PCF studies. First, the composite fibers include scattering fibers, whereas glass PCFs have holes as scattering sites. In addition, in some embodiments, the materials of the composite fiber comprise at least one birefringent material, whereas prior PCFs contain only isotropic materials.

Also, in some embodiments, the density of scattering fibers across the cross-section of the composite fiber may be relatively uniform, with scattering fibers positioned across substantially the entire cross-section of the composite fiber. The total cross-sectional area of the scattering fibers may comprise about 1%-95% of the cross-sectional area of the composite fiber, preferably 10%-90% and more preferably 10%-50%. The fill ratio need not be uniform across the composite fiber. The scattering sites in prior PCFs, however, are typically concentrated around the center core of the fiber, with large areas surrounding the core being devoid of scattering sites. Consequently, the cross-sectional areas of the scattering sites comprise a small fraction of the total cross-sectional area of the prior PCF.

The particular arrangement of scattering fibers within the composite fiber may be selected using known methods to provide a particular spectral response to the reflection and transmission of an optical element that uses the composite fiber.

Figure 2H:
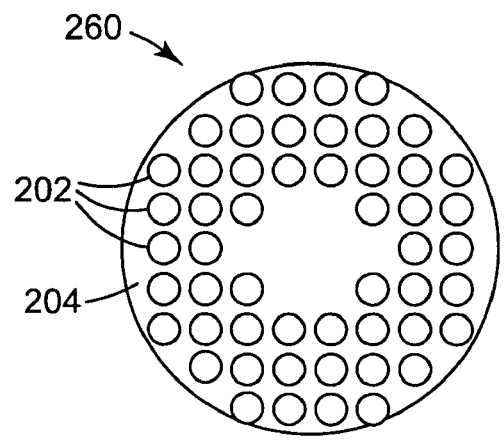
Figure 2I:
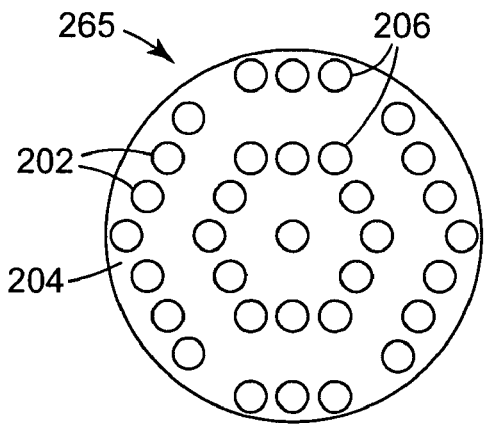
Figure 2J:
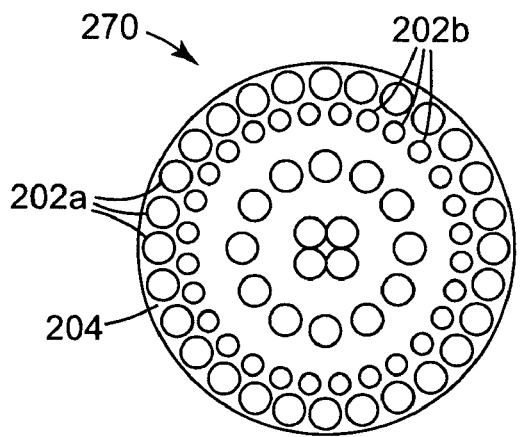

Additional exemplary embodiments of composite fiber showing an inexhaustive selection of possible scattering fiber arrangements is now described. In the exemplary embodiment of composite fiber 260 schematically illustrated in FIG. 2H, some scattering fibers 202 are arranged regularly in an area around the center of the fiber 260, but the center portion of the fiber 260 is clear of scattering fibers. In another example of composite fiber 265 schematically illustrated in FIG. 2I, the scattering fibers 202 are arranged in concentric rings 206. The size of the scattering fibers 202 and the size of the gap and/or the concentric rings may be selected for particular optical properties, such as transmission and/or reflection. In the example illustrated in FIG. 2I, the scattering fibers are shown to be located at positions set by a hexagonal grid. This is not a necessary condition, and the scattering fibers 202 may be formed in a radially concentric pattern, for example as is schematically illustrated in FIG. 2J.

Figure 2K:
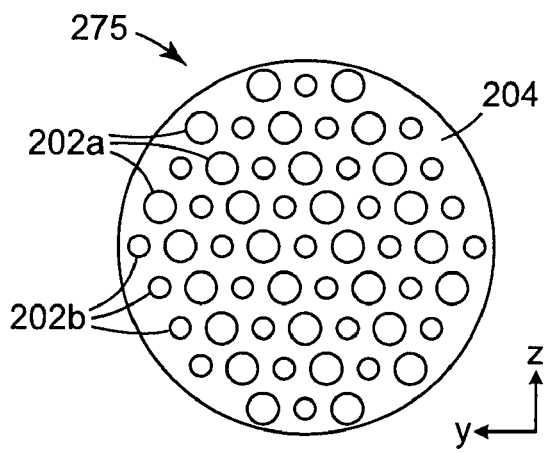

In some embodiments, the scattering fibers 202 need not all be the same size. For example, as is shown for the embodiments of composite fiber 270 and 275 illustrated in FIGS. 2J and 2K, the composite fiber may include scattering fibers of different cross-sectional sizes. In these particular embodiments, the scattering fibers 202a are relatively larger in cross-section and the scattering fibers 202b are relatively smaller in cross-section. The scattering fibers 202 may fall into groups of at least two different sizes and, in fact, may all be different sizes. Furthermore, a scattering fiber 202 may be located at the center of the composite fiber, for example as illustrated in FIG. 2I, or there may be no scattering fiber 202 at the center of the composite fiber: for example scattering fibers 202a are positioned surrounding, but not at, the center of the composite fiber 270 in FIG. 2J. In practice, the dimensions of the scattering fibers 202 may fall within a range, rather than being single-valued.

Figure 3A:
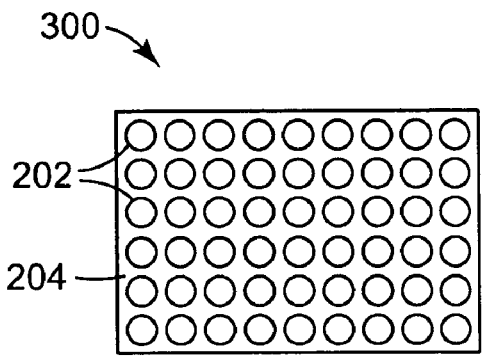
FIGS. 3A-3I schematically illustrate cross-sectional views of various additional embodiments of composite fiber according to principles of the present invention.
Figure 3B:
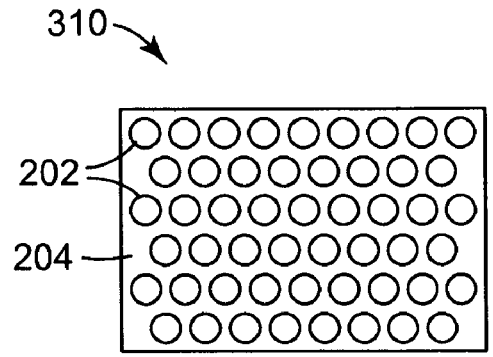
Figure 3C:
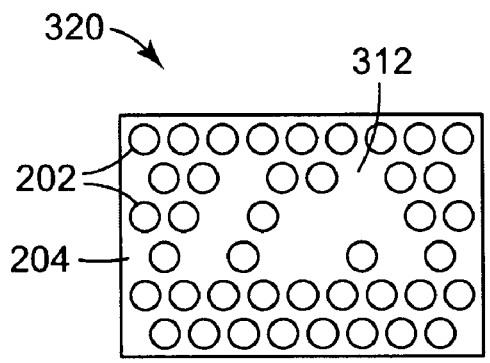

As has been discussed above, the composite fiber need not be circular in shape, and may have a non-circular cross-section. In illustration, FIGS. 3A and 3B show non-circular composite fibers 300, 310 that contain scattering fibers 202 in square and hexagonal patterns respectively. The non-circular fiber may have its scattering fibers 202 positioned at points on a regular grid pattern, but not all positions of the grid pattern need be associated with a scattering fiber 202. For example, the non-circular composite fiber 320 schematically illustrated in FIG. 3C contains scattering fibers 202 positioned on a hexagonal grid, but some gaps 312 may be present between fibers. There is no axis of symmetry in this particular arrangement of scattering fibers 202.

Figure 3D:
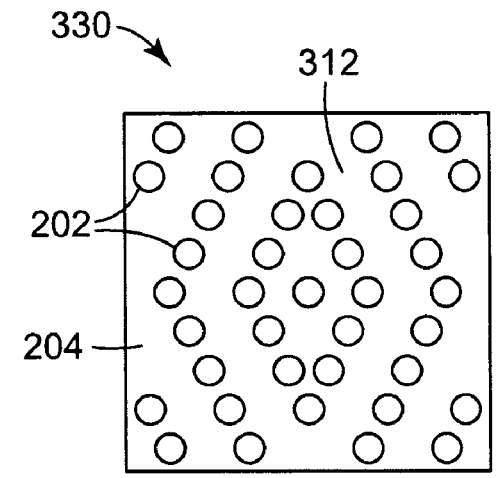
Figure 3E:
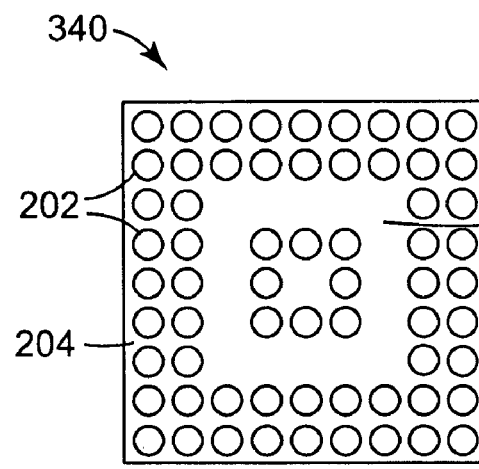

Other exemplary embodiments of non-circular composite fibers 330, 340 are schematically illustrated in FIGS. 3D and 3E. These exemplary non-circular composite fibers 330, 340 are square in cross-section and contain scattering fibers 202 arranged in different exemplary patterns. The scattering fibers 202 in composite fiber 330 are arranged on a hexagonal grid pattern, whereas the scattering fibers 202 in composite fiber 340 are arranged in a square grid pattern. In each case, there are gaps within the arrangement of scattering fibers 202.

The scope of the invention is intended to cover all arrangements of scattering fibers within the composite fibers. In some exemplary arrangements, the relative positions of the scattering fibers, the size of the scattering fibers, and the difference in the refractive index between the scattering fibers and the filler materials may be set to provide desired spectrally selective properties to the composite fiber. Examples of such spectrally selective properties include, but are not limited to, reflection and transmission. In some embodiments of composite fiber, the cross-sectional locations of the scattering fibers may lead to incoherent scattering of the incident light. In other embodiments, the locations of the scattering fibers may lead to coherent effects in the scattered light that give rise to photonic crystal properties. The average density of scattering fibers within the composite fiber may cover a large range, for example the fraction of the cross-sectional area of a composite fiber taken by the scattering fibers may be in the ranges discussed above, namely 1% to 95%, preferably 10% to 90% and more preferably 10% to 50%, although the scattering fiber density may also fall outside these ranges.

Figure 4:
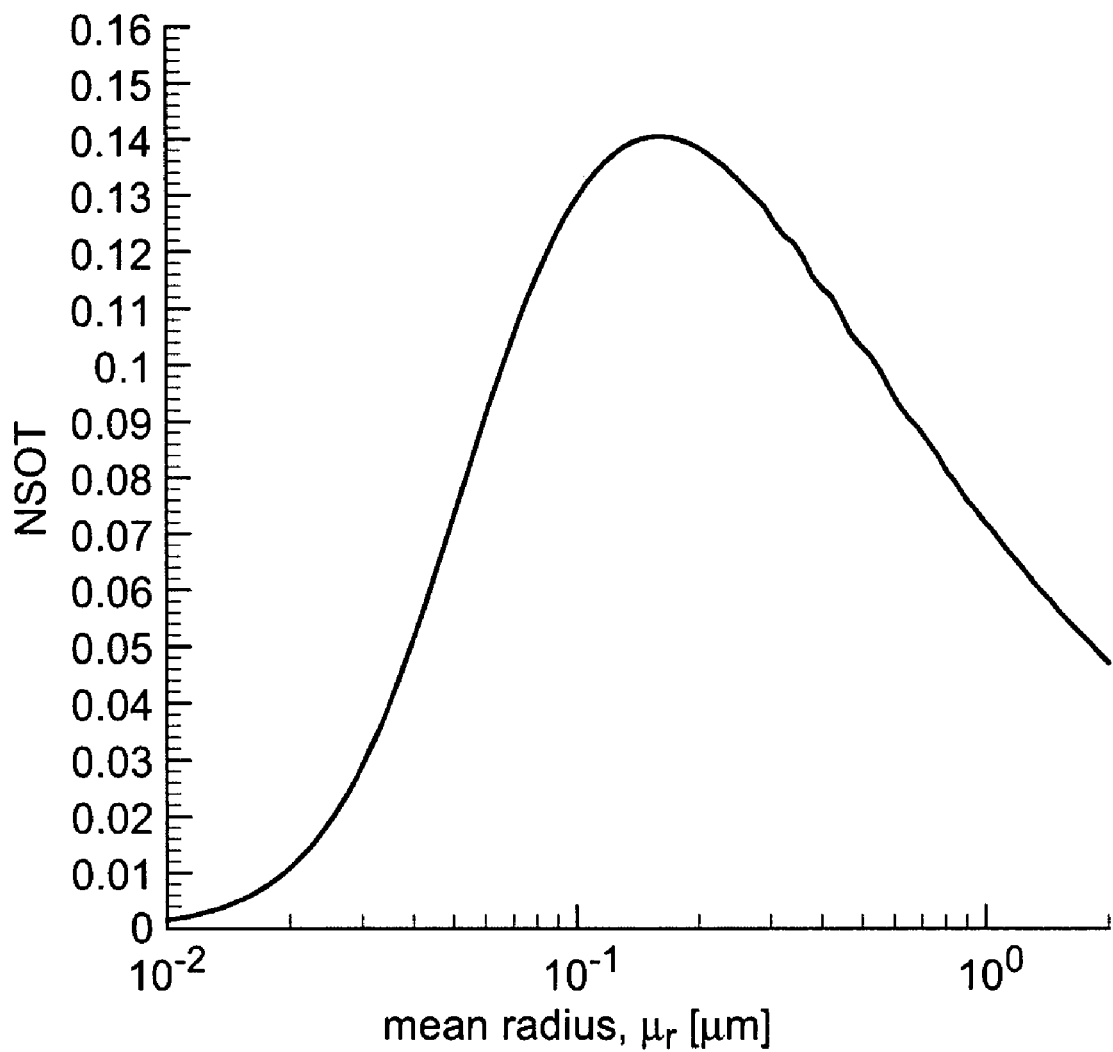
FIG. 4 presents a graph showing light scattering efficiency as a function of scattering fiber radius.

The size of the scattering fibers 202 can have a significant effect on scattering. A plot of scattering effectiveness, the normalized, scaled optical thickness (NSOT), is shown as a function of mean radius of the scattering fiber, in FIG. 4. The NSOT is given by the following expression:

$$NSOT = \tau(1-g)/(tf)$$

where $\tau$ is the optical thickness and equals tk, where k is the extinction cross-section per unit volume (the reciprocal of the mean free path for extinction), t is the thickness of the diffuser, f is the volume fraction of diffusers and g is the asymmetry parameter. The value of g is +1 for pure forward-scattering, −1 for pure back-scattering and zero for equally forward and backward scattering. The calculation used to produce the plot assumed that the vacuum wavelength of the incident light was 550 nm.

As can be seen, the scattering effectiveness peaks at a radius of about 150 nm, and has a value of about half the maximum over a radius range of about 50 nm-1000 nm. The scattering fibers may have any desired cross-sectional dimension, but the cross-sectional dimension may be in the range of about 50 nm to about 2000 nm, and more preferably in the range of about 100 nm to about 1000 nm, for light centered at a wavelength of about 550 nm. The cross-sectional dimension is the diameter where the scattering fiber has an approximately circular cross-section, and may be taken as the scattering fiber width for non-circular fiber cross-sections. The size of the scattering fibers may be different where the composite fiber is being used for applications where the wavelength of the incident light lies outside the visible region of the spectrum, for example in the ultraviolet or infrared regions. In general, a preferred range for the cross-sectional dimension of the scattering fibers is around $\lambda/10$ to around $4\lambda$, where $\lambda$ is the vacuum wavelength of the light. Where the light is present in a range of wavelengths, the value of $\lambda$ may taken as the center value of the wavelength range, although the composite fiber may also be provided with scattering fibers having a range of dimensions.

If the scattering fibers are too small, for example less than about one thirtieth of the wavelength of light within the composite fiber, or below about 0.012 µm for light at 550 nm in vacuum, and if the density of scattering fibers is sufficiently high, for example in the range of about 60%-80% of the composite fiber volume, then the optical element behaves as a medium with an effective refractive index somewhat between the indices of the scattering fiber and the filler along any given axis. In such a case, little light is scattered. When the scattering fiber's cross-sectional size becomes significantly larger than the light wavelength, for example at least three times the wavelength or more, the scattering efficiency becomes very low and iridescence effects can occur.

The cross-sectional dimensions of the scattering fibers can vary depending on the desired use of the optical material. Thus, for example, the dimensions of the scattering fibers may vary depending on the wavelength of light that is of interest in a particular application, with different dimensions required for scattering or transmitting visible, ultraviolet, and infrared light. Generally, however, the dimension of the scattering fibers should be approximately greater than about one thirtieth of the smallest wavelength of light in the wavelength range of interest, in the material.

At the upper side of the desired dimensional range, the average dimension of the scattering fibers is preferably equal to or less than twice the wavelength of light over the wavelength range of interest, in the material, and preferably less than 0.5 of the desired wavelength.

The density of the scattering fibers within the composite fiber affects the amount of scattering that takes place. It may be useful for the center-to-center spacing between the scattering fibers to be about $\lambda/10$ to about $2\lambda$, where $\lambda$ is the center or average vacuum wavelength of the incident light.

Figure 3F:
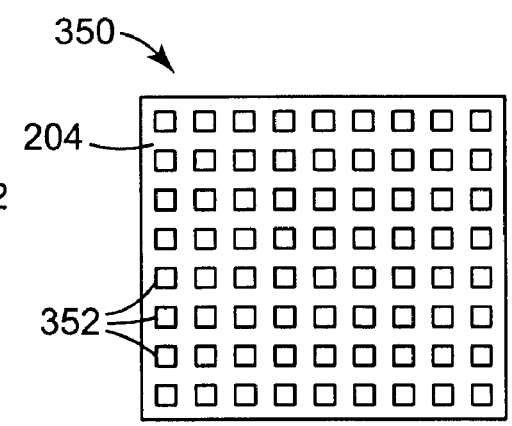

The scattering fibers may be round in cross-section, but need not be round and may have other cross-sectional shapes. In the exemplary composite fiber 350, schematically illustrated in cross-section in FIG. 3F, the scattering fibers 352 have a square cross-section. Other shapes of cross-section may be used, for example regular and irregular polygonal shapes, such as triangular, rectangular or hexagonal, or cross-sectional shapes that combine curved and straight sides. The intention is not to limit the invention to scattering fibers having those cross-sectional shapes shown in the illustrations.

The use of scattering fibers having non-circular cross-sections is useful when the center-to-center fiber spacing is non-uniform, since it permits the scattering fibers to fill a greater fraction of the cross-sectional area of the composite fiber. For example, if the scattering fibers are arranged on a rectangular grid and the center-to-center spacing is twice as large in the y-direction as the z-direction, the scattering fibers fill a greater cross-section of the composite fiber if the scattering fibers have an elliptical cross-section that is twice as long in the y-direction than the z-direction than if the scattering fibers were circular.

Figure 3G:
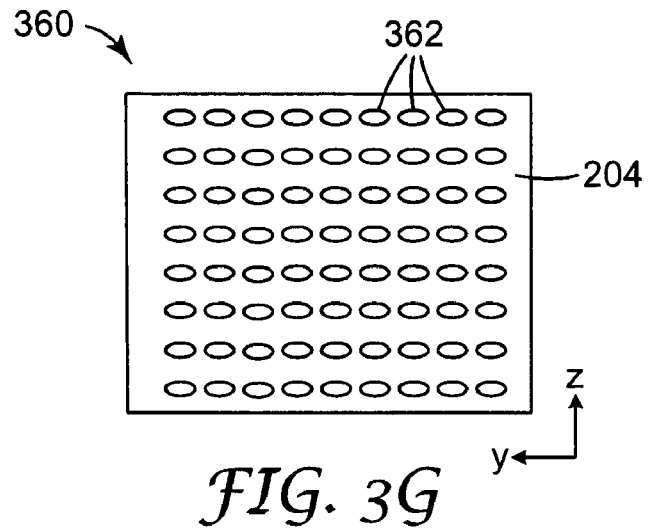
Figure 3H:
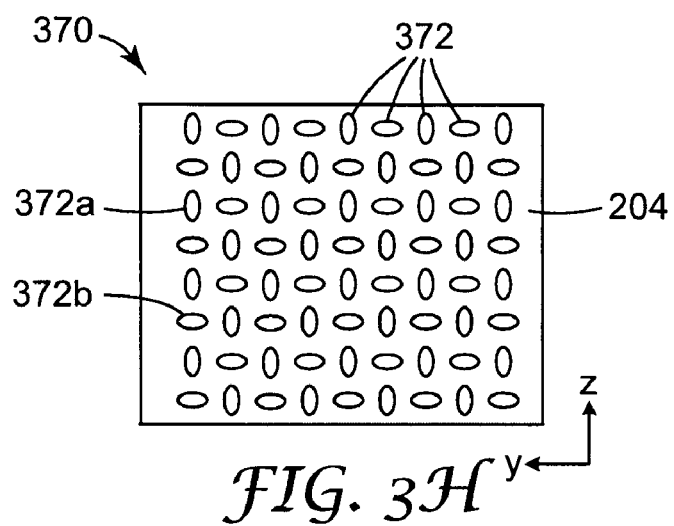
Figure 3I:
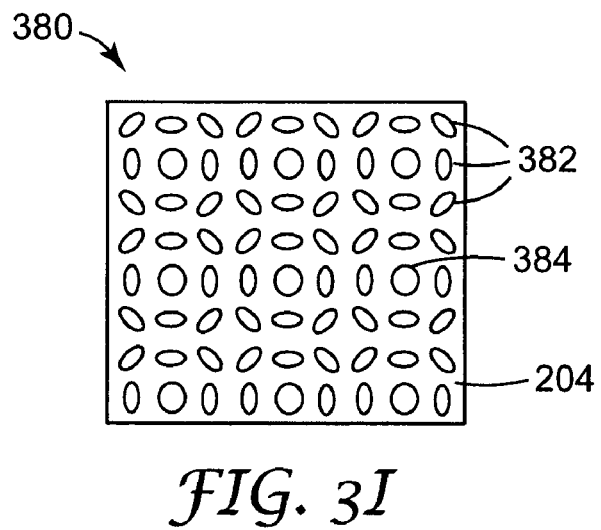
Figure 3J:
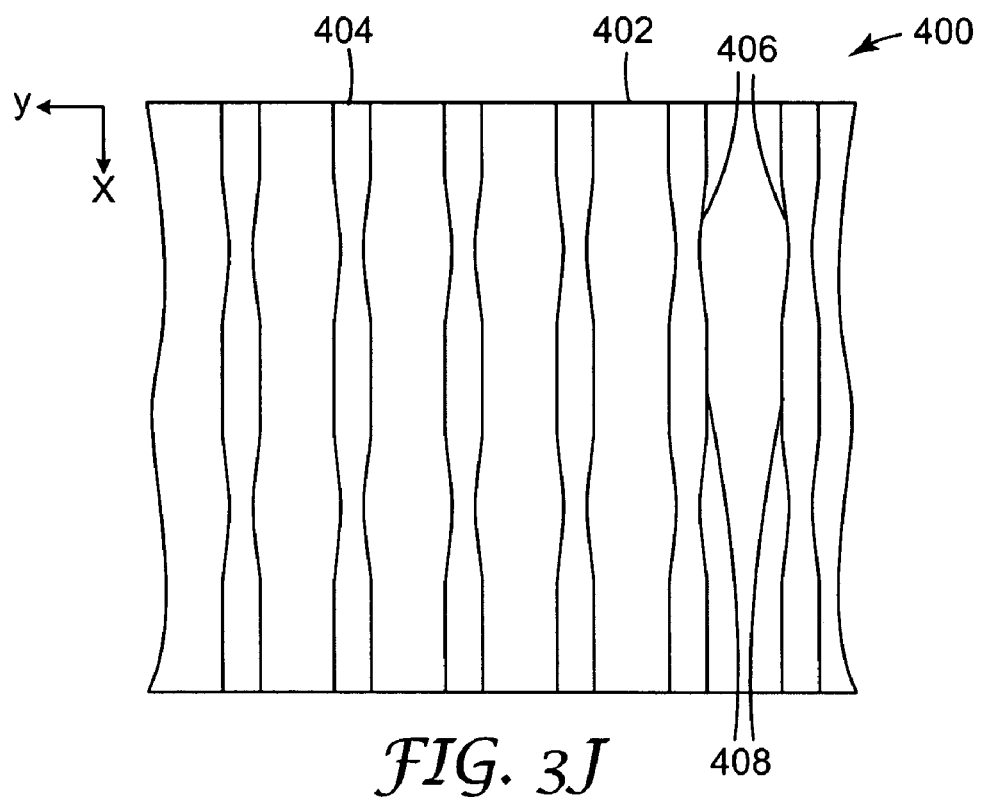
FIGS. 3J-3M schematically illustrate cross-sectional views of more embodiments of composite fibers, showing variations in the cross-sectional dimension along the scattering fibers, according to principles of the present invention.

Some additional exemplary arrangements of scattering fibers having non-circular cross-section are schematically illustrated in FIGS. 3G-3I. The non-circular scattering fibers may be arranged with their cross-sectional shapes arranged in random directions. In other embodiments, the cross-sections of the scattering fibers may be aligned relative to each other. For example, in FIG. 3G, the composite fiber 360 is formed with a filler 204 embedded with scattering fibers 362 having an elliptical cross-section. In this particular embodiment, the scattering fibers 362 are aligned with the long axes of their cross-sectional ellipses parallel with the y-axis.

The cross-sectional shape of the scattering fibers may be a result of the shape of the extrusion die, or may be a result of post-processing the optical element after extrusion.

The scattering fibers need not be arranged with their cross-sections all in alignment, but different scattering fibers may have different alignments within the composite fiber. In the exemplary embodiment of composite fiber 370, schematically illustrated in FIG. 3H, the scattering fibers 372 have an elliptical cross-section and some fibers 372a are arranged with their long axes parallel to the z-axis while other fibers 372b are arranged with their short axes parallel to the z-axis. Approximately half of the scattering fibers 372 are aligned in each direction. Also, the populations of the fibers 372a and 372b are arranged regularly within the cross-section of the composite fiber 370. It will be appreciated that the populations of the fibers 372a and 372b may also be arranged irregularly within the cross-section of the composite fiber 370.

Other variations on the illustrated embodiments are possible. For example, not all scattering fibers need have the same cross-sectional shape, size or alignment. Furthermore, the scattering fibers may be cross-sectionally aligned to form patterns within the composite fiber. One particular example of such a composite fiber 380 is schematically illustrated in FIG. 3I. The filler 204 is embedded with scattering fibers having two different shapes of cross-section, elliptical fibers 382 and circular fibers 384. In the illustrated embodiment, the elliptical fibers 382 are aligned so that the short axes of their elliptical cross-sections are directed towards the closest circular fiber 384. Other patterns of scattering fibers may be used.

The scattering fibers may lie untwisted within the composite fiber, so that a face of the scattering fiber is oriented towards one face of the composite fiber along the length of the scattering fiber. In other exemplary embodiments, the scattering fibers may be twisted within the composite fiber, so that, at different points along the length of a scattering fiber, a face of the scattering fiber is oriented towards different faces of the composite fiber.

While an index mismatch is the predominant factor relied upon to promote polarization-dependent scattering within composite fibers, the cross-sectional shape of the composite fibers may also have an effect on scattering. For example, when the scattering fiber is elliptical in a cross-section, the elliptical cross-sectional shape may contribute to asymmetric diffusion in both back scattered light and forward scattered light. The effect can either add or detract from the amount of scattering from the index mismatch.

Furthermore, a scattering fiber may be uniform in cross-sectional dimension along its length, or the cross-sectional dimension may be different for different points along the length of the scattering fiber. Examples of such a variation are schematically illustrated in FIGS. 3J-3M, which show lengthwise cross-sectional views through a composite fiber, in the x-y plane. In the embodiment illustrated in FIG. 3J, the composite fiber 400 includes scattering fibers 404 embedded within a matrix 402. In this particular embodiment, the scattering fibers 404 have regions 406 where the cross-sectional dimension is relatively small and regions 408 where the cross-sectional dimension is relatively large. Such regions 406, 408 may be produced, for example, by temporarily reducing or increasing the pressure on the scattering fiber polymer while the composite fiber 400 is being co-extruded.

Figure 3K:
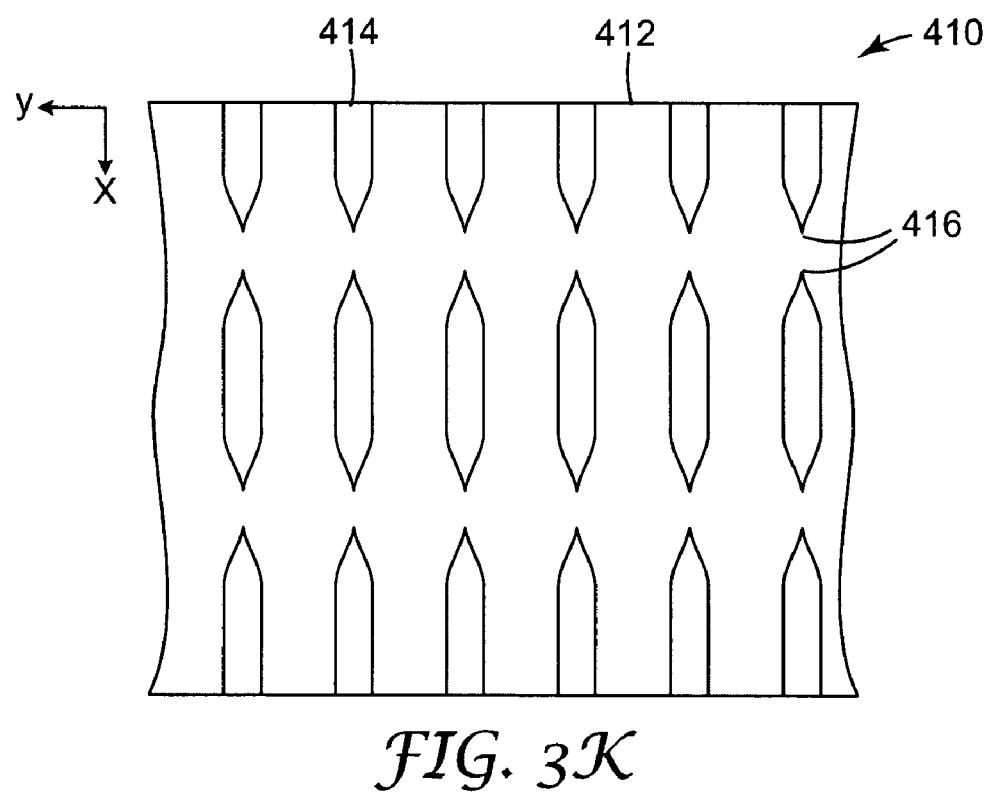

In another embodiment, schematically illustrated in FIG. 3K, the composite fiber 410 includes scattering fibers 414 within a matrix 412, where the cross-sectional width of the scattering fibers 414 is reduced to zero in some regions 416. This may be achieved by a greater reduction in the pressure of the scattering fiber polymer during co-extrusion.

Figure 3L:
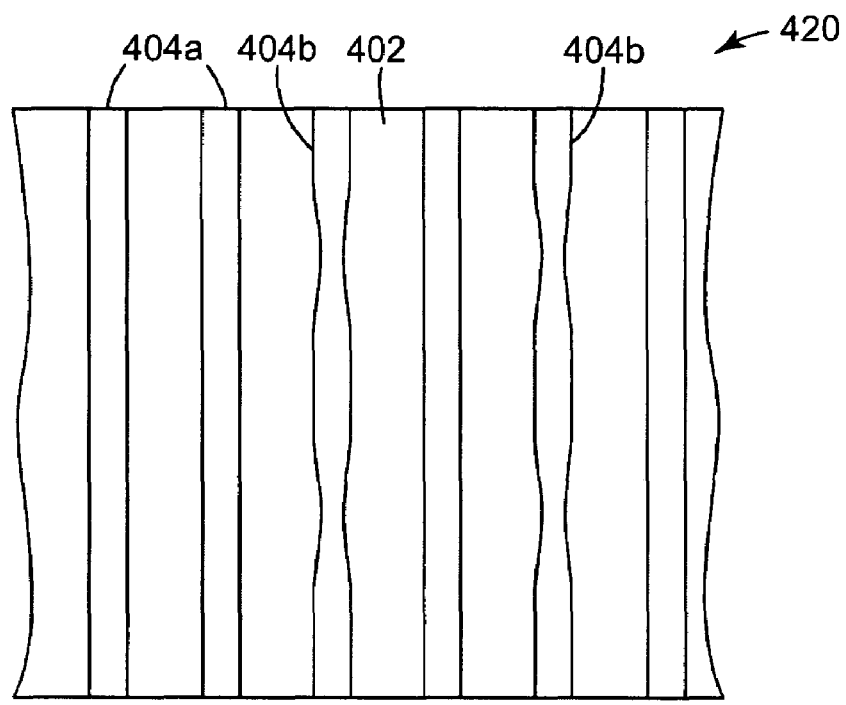
Figure 3M:
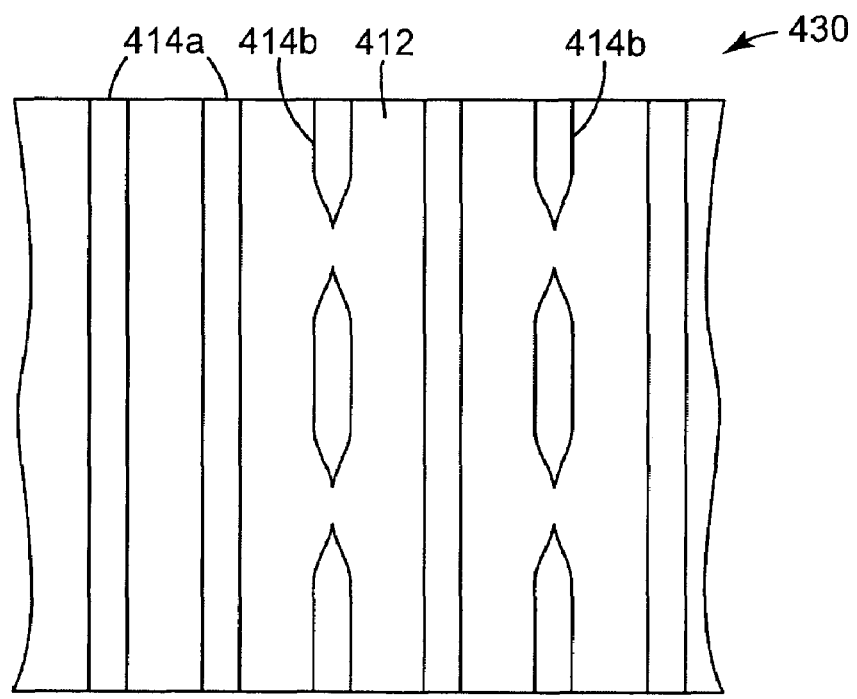

Not all scattering fibers need vary in cross-sectional dimension in the same manner. For example, FIGS. 3L and 3M show cross-sections similar to those of FIGS. 3J and 3K respectively, but where some scattering fibers 404a, 414a have uniform cross-sectional dimension and other scattering fibers 404b, 414b vary in cross-sectional dimension. Such variation in some scattering fibers 404b, 414b, may be achieved, for example, by having two inputs to a coextrusion feedblock for scattering fiber polymer. One of the inputs is subject to constant pressure to produce the scattering fibers 404a, 414a of constant cross-section, while the other input is subject to a variation in the pressure, to produce the scattering fibers 404b, 414b of varying cross-section.

Figure 5:
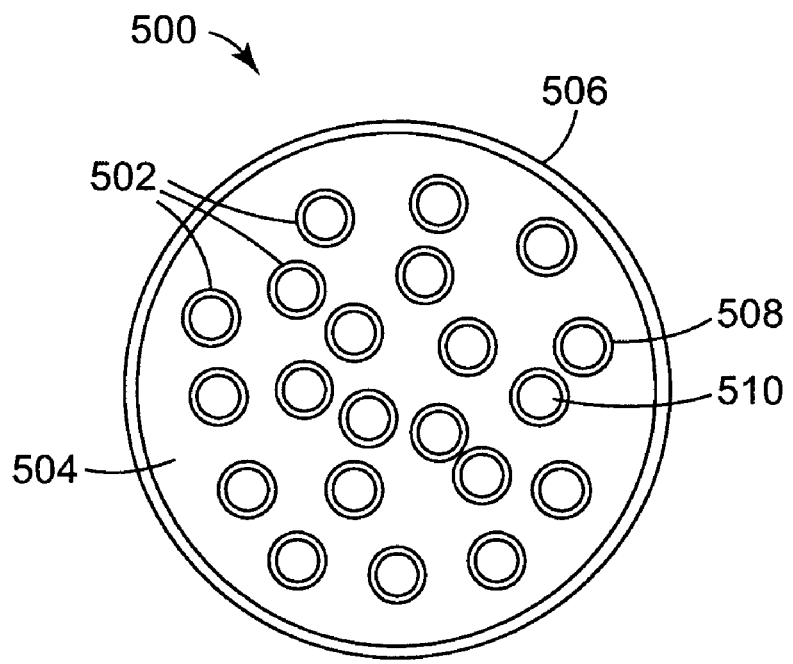
FIG. 5 schematically illustrates an embodiment of a composite fiber that includes scattering fibers having a core/shell construction, according to principles of the present invention.

In some embodiments, the scattering fibers may have a core and shell construction. An exemplary embodiment of a composite fiber 500 having scattering fibers 502 formed with a shell and core construction is schematically presented in FIG. 5. In this embodiment, the composite fiber 500 has an outer layer 506 and the scattering fibers 502 are embedded within a filler 504. The scattering fibers 502 are formed with a shell layer 508 surrounding a core 510. The shell layer 508 and core 510 are made out of the same or different materials. The shell layer 508 and the core 510 may be formed from polymer materials, for example from polymer materials as described above. The core 510 may be hollow or may be occupied by a suitable medium which may be a solid, liquid, or gas, and may be organic or inorganic. The cross-sectional shape of the core 510 may be uniform along the length of the scattering fiber 502 or may vary along the length of the scattering fiber 502. The refractive index of the medium used in the core 510 may be chosen in consideration of the refractive index difference at the birefringent interfaces with the shell 508 so as to achieve a desired degree of reflection or scattering at the birefringent interface. Suitable isotropic and birefringent polymer materials have been discussed above. In some embodiments, the shell/core scattering fibers 502 may be formed with either the shell 508 or the core 510 formed of a birefringent material, or both the shell 508 and core 510 may be formed of a birefringent material. In other embodiments, both the shell 508 and core 510 may be formed from isotropic materials.

The shell 508 may be used, for example, to affect the adhesion between the scattering fiber 502 and the filler 504. In some embodiments, the shell 508 may be formed of a material that increases the adhesion between the scattering fiber 502 and the filler 504, for example, a polyester resin coating, a silane coating or other primer used for increasing the adhesion between the polymer matrix and the polymer fibers. In other embodiments, the shell 508 may be made of a material that reduces the adhesion between the scattering fibers 502 and the filler 504, for example, fluorocarbon materials, silicone materials and the like. In some embodiments, the shell 508 may be used to provide an antireflection function, for example, by providing some refractive index matching between the core 510 and the filler 504.

Figure 6:
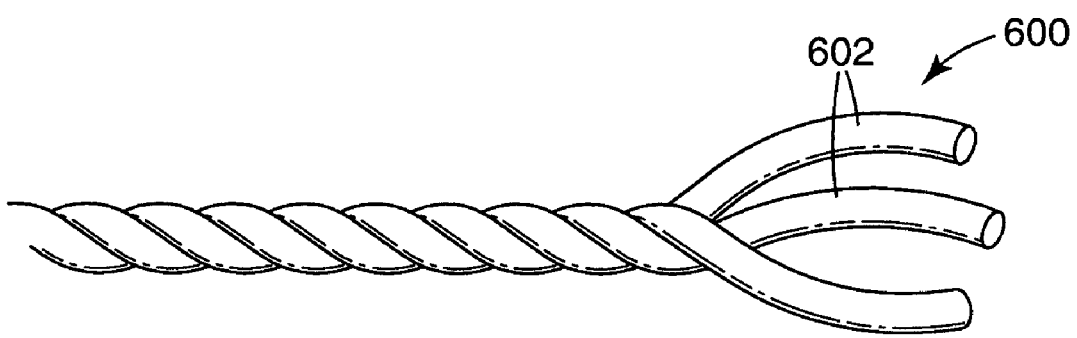
FIG. 6 schematically illustrates an embodiment of a composite fiber yarn according to principles of the present invention.

The composite fiber may be formed as a yarn 600, one exemplary embodiment of which is schematically illustrated in FIG. 6. The yarn 600 may be formed by twisting oriented fibers 602 together to form the yarn, and then filling the spaces between the fibers 602 with the filler material. In another approach, the yarn 600 may be formed by twisting isotropic fibers 602 together, where the fibers are made of an orientable material. The fibers may then be oriented, for example, by stretching after forming the yarn. A filler material may be applied between the twisted fibers 602 before or after the material of the fibers 602 is oriented. In other exemplary embodiments, the fibers 602 may be made from a non-birefringent material, with the filler formed of an orientable material. The yarn 600 is not restricted to containing fibers of only the orientable material, and may include other fibers, for example fibers of other polymeric materials, isotropic or birefringent; natural fibers, such as cotton, silk or hemp; and inorganic fibers such as glass or glass-ceramic fibers.

The yarn 600 may include fiber or lengths of fiber comprised of glass, ceramic, and/or glass-ceramic materials. Glass-ceramic materials generally comprise 95-98 volume percent of very small crystals, with a size generally smaller than 1 µm. Some glass-ceramic materials have a crystal size as small as 50 nm, making them effectively transparent at visible wavelengths, since the crystal size is so much smaller than the wavelength of visible light. These glass-ceramics can also have very little, or no, effective difference between the refractive index of the glassy and crystalline regions, making them visually transparent. In addition to the transparency, glass-ceramic materials can have a rupture strength exceeding that of glass, and are known to have coefficients of thermal expansion of zero or that are even negative in value. Glass-ceramics of interest have compositions including, but not limited to, $Li_2O$—$Al_2O_3$—$SiO_2$, $CaO$—$Al_2O_3$—$SiO_2$, $Li_2O$—$MgO$—$ZnO$—$Al_2O_3$—$SiO_2$, $Al_2O_3$—$SiO_2$, and $ZnO$—$Al_2O_3$—$ZrO_2$—$SiO_2$, $Li_2O$—$Al_2O_3$—$SiO_2$, and $MgO$—$Al_2O_3$—$SiO_2$.

Some ceramics also have crystal sizes that are sufficiently small that they can appear transparent if they are embedded in a matrix polymer with an index of refraction appropriately matched. The Nextel™ Ceramic fibers, available from 3M Company, St. Paul, Minn., are examples of this type of material, and are already available as thread, yarn and woven mats. Suitable ceramic or glass-ceramic materials are described further in *Chemistry of Glasses, 2nd Edition* (A. Paul, Chapman and Hall, 1990) and *Introduction to Ceramics, 2nd Edition* (W. D. Kingery, John Wiley and Sons, 1976), the relevant portions of both of which are incorporated herein by reference.

The yarn 600 may include lengths of fiber, commonly referred to as staple fiber, that do not extend over the entire length of the yarn 600. In some embodiments, the yarn 600 may be encapsulated within a polymer matrix, with the matrix filling the spaces between the fibers 602 that comprise the yarn 600. In other embodiments, the yarn 600 may have a filler between the fibers 602.

Suitable birefringent polymer materials for use in the yarn 600 have been discussed above.

In other embodiments, two or more composite fibers may be twisted together to form a yarn.

The composite fibers of the present disclosure may be arranged within a polymer matrix in many different ways to form an optical element. For example, as illustrated in FIG.

Figure 7A:
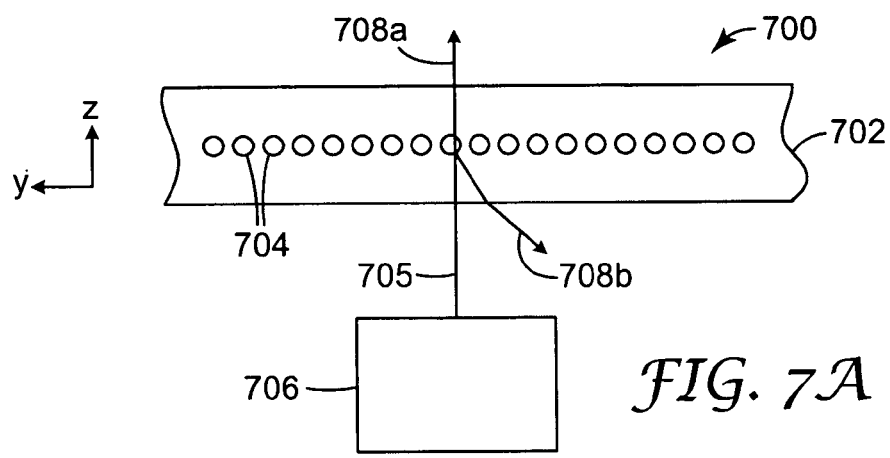
FIGS. 7A-7E schematically illustrate cross-sectional views through embodiments of optical elements containing composite fibers according to principles of the present invention.

1, the composite fibers 104 may be arranged randomly across the cross-sectional area of the matrix 102. Other arrangements may be used. For example, in the exemplary embodiment schematically illustrated in FIG. 7A, which shows a cross-section through an optical element 700, the composite fibers 704 are arranged in a one-dimensional array within the matrix 702, with regular spacing between adjacent composite fibers 704. In some variations of this embodiment, the spacing between adjacent composite fibers 704 need not be the same for all fibers 704. The figure schematically illustrates the optical element 700 being illuminated laterally by light 705 from a light source 706. Some of the light 708a is transmitted through the element 700 and some of the light 708b is diffusely reflected by the element 700.

In general, the birefringent interfaces of the composite polymer fibers 704 are elongated, extending in a direction along the composite fibers 704. In some exemplary embodiments of optical elements that include composite fibers, the scattering fibers 704 lie parallel to the x-axis, and so the diffusely reflected light is scattered mostly into the plane perpendicular to the fibers, the y-z plane, and there is little scattering in the x-z plane. Optical elements that incorporate composite fibers having a polarization-dependent scattering characteristic may themselves demonstrate a polarization-dependent characteristic. For example, the optical element may be a reflective polarizer that transmits light in one polarization state and diffusely reflects light in the orthogonal polarization state.

Figure 7B:
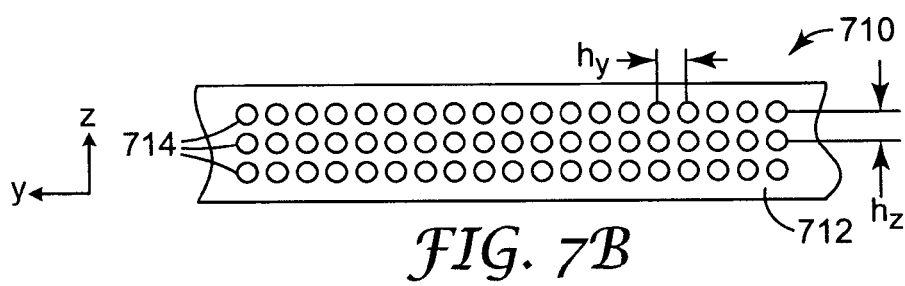
Figure 7C:
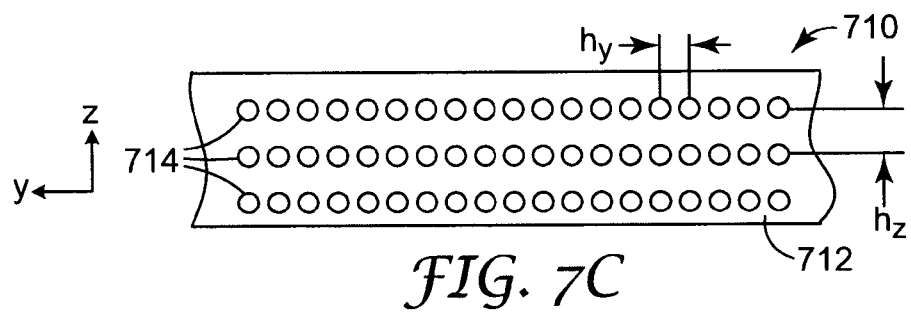
Figure 7D:
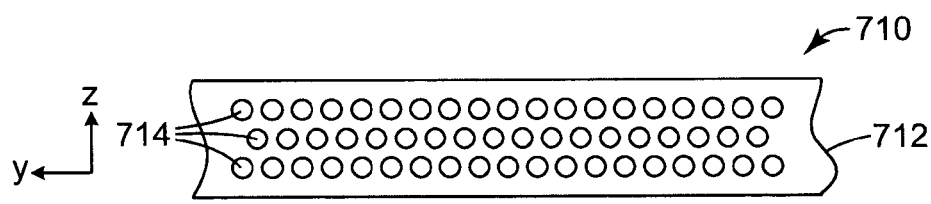

In another exemplary embodiment of an optical element, schematically illustrated in FIG. 7B in cross-section, the composite fibers 714 are arranged in a regular two-dimensional array within the matrix 712. In the illustrated embodiment, the separation distance, $h_y$, between adjacent composite fibers 714 in the y-direction is the same as the separation distance, $h_z$, between adjacent composite fibers 714 in the z-direction. This need not be the case, and the separation distance in the z-direction may be different from that in the y-direction, as is schematically illustrated in FIG. 7C. Furthermore, the fibers 714 need not be aligned in rows parallel to the z-axis, but there may be an offset between adjacent rows, for example as is schematically illustrated in FIG. 7D, creating a hexagonally-packed fiber pattern. Other regular patterns of fibers 714 may be employed.

Figure 7E:
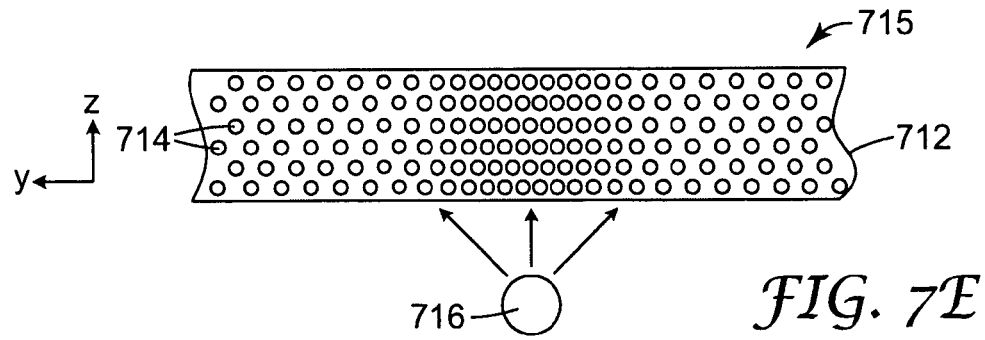

In other embodiments, the spacing between composite fibers may vary along the width of the matrix, i.e. along the y-direction, through the thickness of the matrix, i.e., along the z-direction, or may change for different positions along both the y- and z-directions. For example, in the embodiment schematically illustrated in FIG. 7E, an optical element 715 has composite fibers 714 embedded within a matrix 712. In this particular embodiment, the center-to-center spacing between adjacent composite fibers 714 is reduced in one region, at the center of the figure, relative to neighboring regions on either side. Consequently, the fill factor, i.e., the fraction of the cross-sectional area taken up by the composite fibers 714, for that region is increased. Such a variation in the fill factor may be useful, for example, to improve the uniformity of light transmitted through the element 715 from a light source 716. This may be important, for example, where the element 715 is included in a direct view screen lit by discrete light sources. In such devices, it is important to present the viewer with an image of uniform illumination. When a light source is placed behind a uniform diffuser, the brightness of the light transmitted through the diffuser is highest above the light source. The variation in fill factor illustrated in FIG. 7E may be used to increase the amount of diffusion directly above the light source 716, thus reducing the non-uniformity in the intensity of the transmitted light.

Figure 7F:
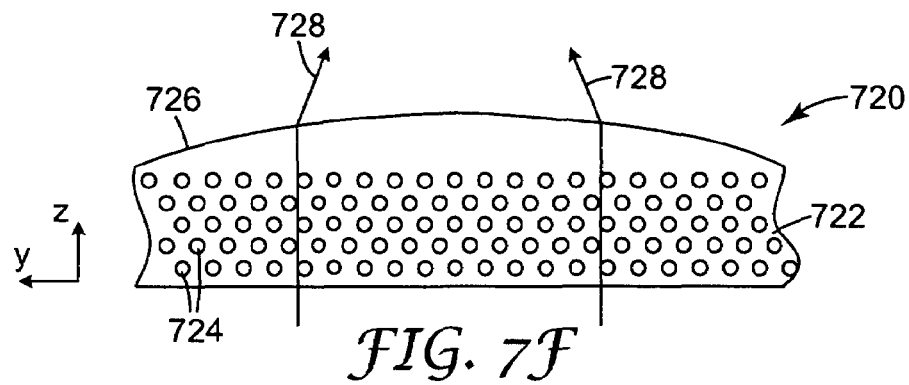
FIGS. 7F-7J schematically illustrate cross-sectional views through embodiments of optical elements having structured surfaces according to principles of the present invention.

The optical element may have flat surfaces, for example the flat surfaces perpendicular to the z-axis as shown in FIG. 1. The optical element may also include one or more surfaces that are structured to provide desired optical effects for light transmitted through, or reflected by, the optical element. For example, in one exemplary embodiment schematically illustrated in FIG. 7F, the element 720, formed with a matrix 722 and a number of composite fibers 724, may have one or more curved surfaces 726. The curved surfaces 726 provide optical power, focusing or defocusing, to light transmitted through the surface 726. In the illustrated embodiment, rays 728 represent examples of light rays, polarized parallel to the transmission axis of the element 720, that are focused by the curved refracting surface 726. In this example, the curved refracting surface 726 is the output surface of the element 720, through which light transmitted by the element 720 exits the element 720. In other exemplary embodiments, the entrance surface of the element 720, through which light enters the element 720, may have a curved surface. Either the input surface or the output surface may include other structures, such as Fresnel lens structure, that provide optical power to light passing through the structured surface.

The structured surface may also include rectilinear regions in addition to, or instead of, curved regions. For example, in another exemplary embodiment, schematically illustrated in FIG. 7G, the element 730, formed with a matrix 732 containing composite fibers 734, may be provided with a prismatically structured surface 736, referred to as a brightness enhancing surface. A brightness enhancing surface is commonly used, for example, in backlit liquid crystal displays, to reduce the cone angle of the light illuminating the display panel, and thus increase the on-axis brightness for the viewer. The figure shows an example of two off-axis light rays 738 and 739. Light ray 738 is in a polarization state that is transmitted by the composite fibers 734, and is also diverted towards the z-axis by the structured surface 736. Light ray 739 is in a polarization state that is diffusely reflected by the composite fibers 734. The brightness enhancing surface may be arranged so that the prism structures are parallel to the fibers 734, which is also parallel to the x-axis, as illustrated. In other embodiments, the prism structures may lie at some other angle relative to the direction of the fibers. For example, the prism structures may form ribs that lie parallel to the y-axis, perpendicular to the fibers 734, or at some angle between the x-axis and the y-axis.

Structured surfaces may be formed on the matrix using any suitable method. For example, the matrix may be cured while its surface is in contact with the surface of a tool, such as a microreplication tool, whose tool surface produces the desired shape on the surface of the matrix.

Figure 7G:
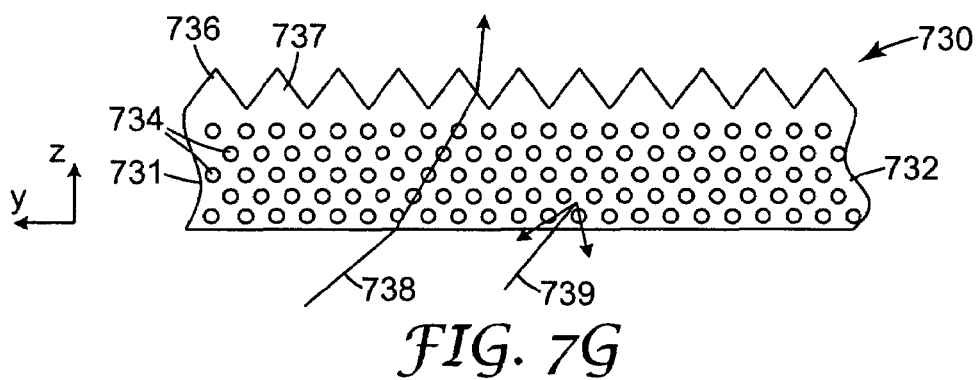
Figure 7H:
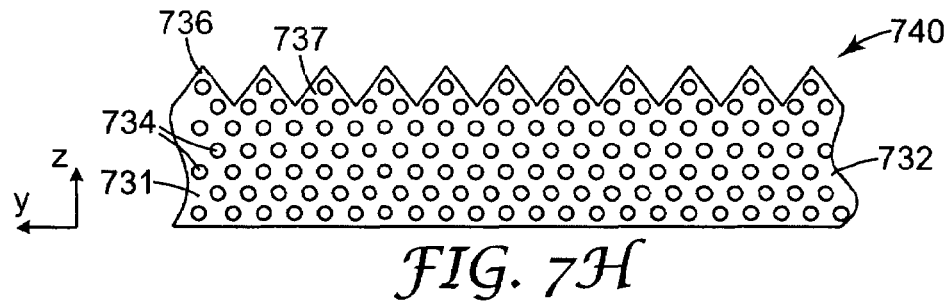
Figure 7I:
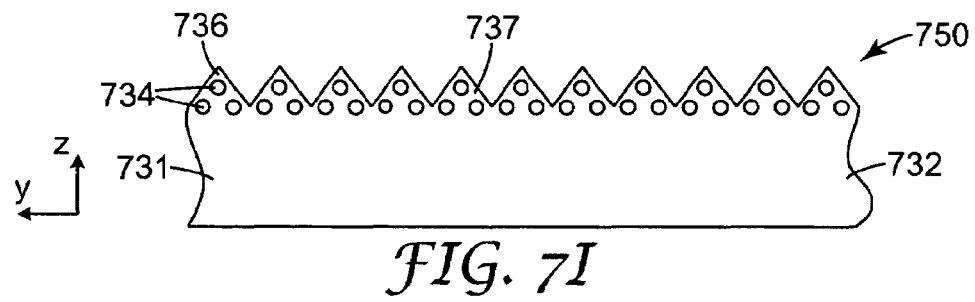

The scattering fibers may be present across different regions of the optical element. In FIG. 7G, the composite fibers 734 are not located in the structure 737 formed by the structured surface 736, but are located only in the main body 731 of the element 730. In other embodiments, the composite fibers 734 may be distributed differently. For example, in the optical element 740, schematically illustrated in FIG. 7H, the composite fibers 734 are located within both the main body 731 of the element 740, and also in the structure 737 formed by the structured surface 736. In another example, schematically illustrated in FIG. 7I, the composite fibers 734 are located only in the structure 737 of the element 750 and not in the main body 731 of the element 750.

Figure 7J:
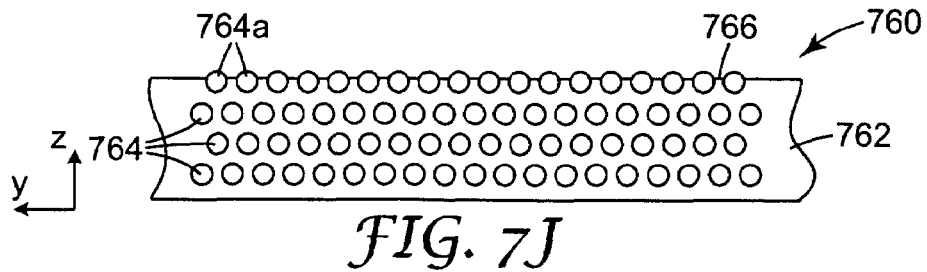

Another exemplary embodiment of the invention is schematically illustrated in FIG. 7J, in which the element 760 has polymer fibers 764 in a matrix 762. In this particular embodiment, some of the fibers 764a are not completely embedded within the matrix 762, but penetrate the surface 766 of the matrix 762.

The use of composite fibers in a polarizer element is described further in co-owned U.S. Patent Publication No. 2006/0193577, filed on even day herewith, having the title REFLECTIVE POLARIZERS CONTAINING POLYMER FIBERS, which application is incorporated herein by reference. The use of scattering fibers in optical elements is discussed also in U.S. Patent Publication No. 2006/0193578, filed on even day herewith, having the title COMPOSITE POLYMERIC OPTICAL FILMS WITH CO-CONTINUOUS PHASES, incorporated herein by reference.

In some exemplary embodiments, the composite fibers disposed within the optical elements contain volumes of different polymer materials, including at least a birefringent material and another material, for example, a substantially non-birefringent material. These different materials may be arranged in many different ways, for example, in regular alternating layers, or as fine fibers of one material disposed within a "pool" of the other material. The matrix material may have less or no birefringence, or may be oppositely birefringent. For example, if the birefringent material in the fiber has $n_x > n_y$, then the matrix material may have $n_y > n_x$.

Figure 8A:
FIGS. 8A-8D schematically illustrate steps in an embodiment of a method of manufacturing an optical element containing composite fibers according to principles of the present invention.
Figure 8B:
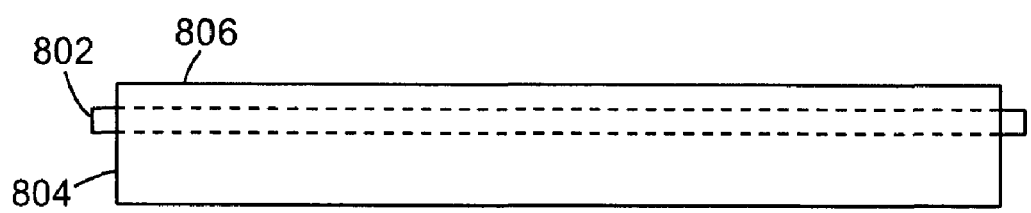

One approach to fabricating an optical element that includes composite fibers according to the present invention is now discussed with reference to FIGS. 8A-8D. One or more composite fibers 802 are laid on a first polymer layer 804 (FIG. 8A), and a second polymer layer 806 is cast, or otherwise formed, over the polymer fibers 802 (FIG. 8B). The first polymer layer 804 and second polymer layer 806 may be of the same polymer material or may be different materials.

Figure 9:
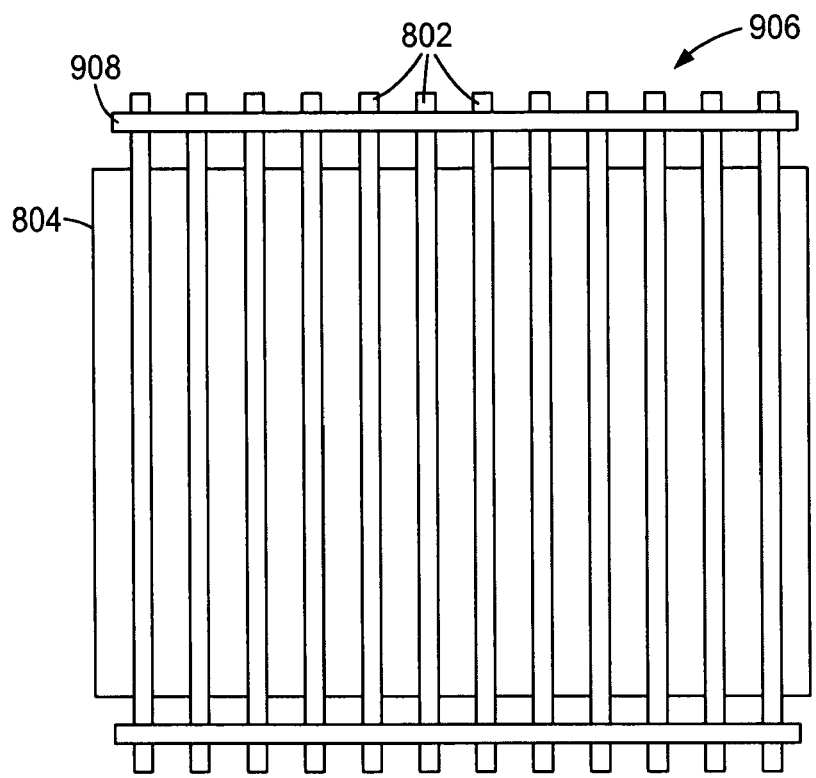
FIG. 9 schematically illustrates a composite fiber tow that may be used in an embodiment of a method of manufacturing a composite fiber optical element according to principles of the present invention.

The fibers 802 may be laid individually or may be laid as a tow, which is an arrangement of fibers 802 that are not twisted together. In particular, the tow may form a layer of composite fibers 802 that are substantially in a plane and that are substantially parallel to each other. A fiber tow 906 is schematically illustrated in FIG. 9. Cross-members 908 may be present to provide support to the polymer fibers 802 and to keep the polymer fibers 802 at a desired spacing relative to their neighbors. Cross-members 908 need not be present, for example, if the polymer fibers 802 are laid over the first polymer layer 804 in a continuous process.

Figure 10:
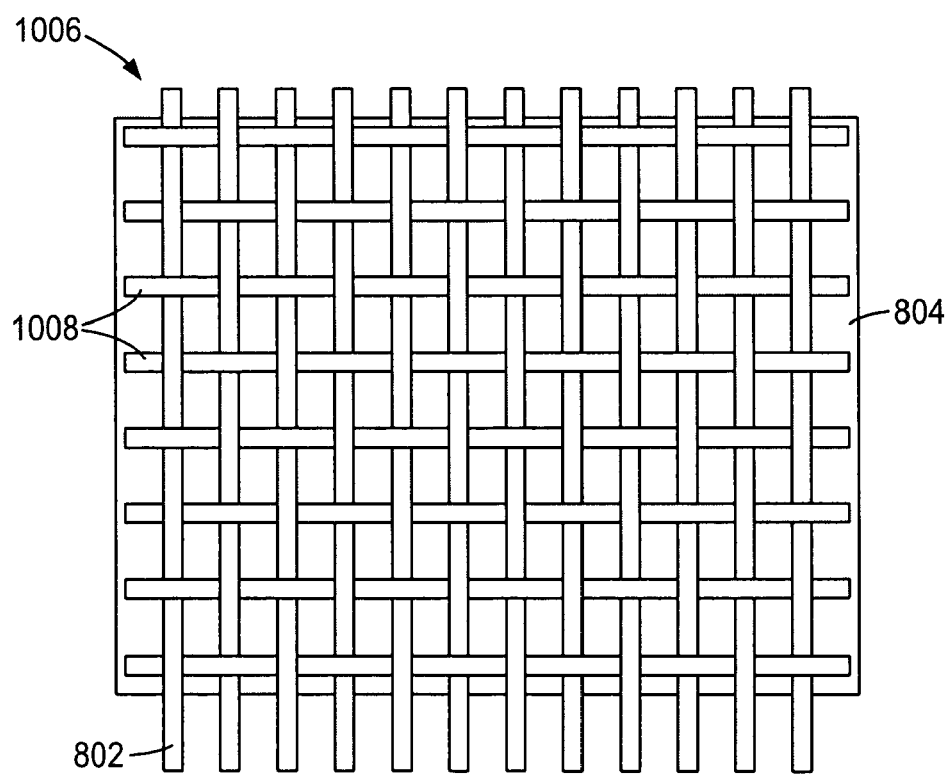
FIG. 10 schematically illustrates a composite fiber weave that may be used in an embodiment of a method of manufacturing a composite fiber optical element according to principles of the present invention.

The fibers 802 may also be laid on the first layer 804 as part of a weave. A weave 1006 is schematically illustrated in FIG. 10 in which the composite fibers 802 form the warp and cross-fibers 1008 form the weft. The cross-fibers 1008 may be made of any suitable fiber material, organic or inorganic, and may be, for example, polymer fibers, such as isotropic or birefringent fibers, or natural fibers, such as cotton, silk and hemp. In other exemplary embodiments, the cross fibers 1008 may be glass fibers, for example E-glass, S-glass fibers, or other types of glass fibers. The refractive index of the cross-fibers 1008 may be substantially matched to that of the surrounding polymer matrix so that they have a reduced optical effect on light passing within the optical element. In addition, not all of the warp fibers need be composite fibers 802 containing birefringent interfaces. For example, some of the warp fibers may also be isotropic fibers, and may be formed of the same type of fiber as the cross-fibers.

The weave may be formed using any suitable weaving process. For example, the weave may be a plain weave, as illustrated, a twill weave, a satin weave, or some other kind of weave. In some exemplary embodiments, the composite fibers 802 are relatively flat within the weave, for example as shown schematically in the partial cross-section in FIG. 11A. Note that this figure conforms to the convention that the composite fibers 802 lie substantially along the x-direction. In some exemplary embodiments, the composite fiber 802 maintains a single orientation in the weave, without being twisted.

Figure 11A:
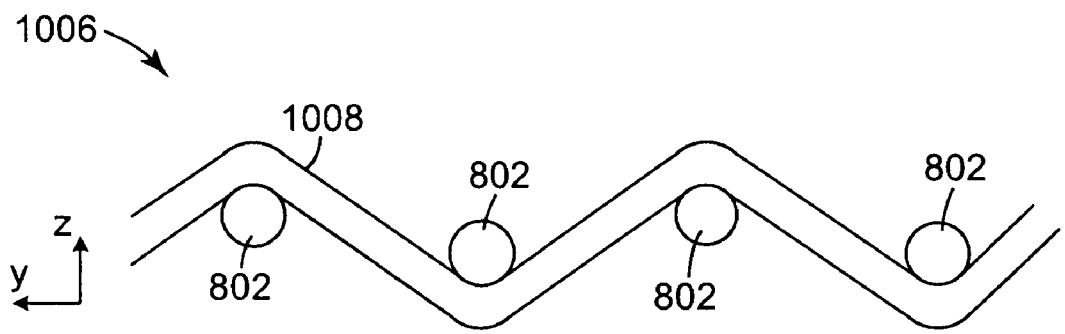
FIGS. 11A and 11B schematically illustrate cross-sectional views of embodiments of a composite fiber weave that may be used in a composite fiber optical element according to principles of the present invention.
Figure 11B:
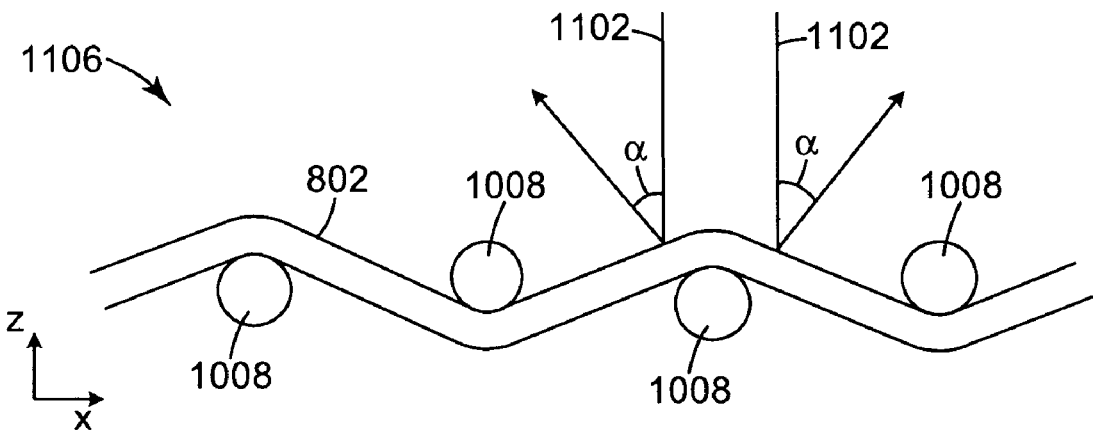

In other embodiments, the composite fibers 802 need not be flat within the weave. An exemplary partial cross-section in such a weave 1106 is schematically illustrated in FIG. 11B. It is important to note that the view in this figure is different from that of FIG. 11A. FIG. 11A shows the side of the cross-fiber 1008, whereas FIG. 11B shows the side of the polymer fiber 802. The coordinate axes conform to the convention used in earlier figures, so the polymer fiber 802 lies generally in a direction parallel to the x-axis. Since the composite fiber 802 undulates within the weave 1106, however, the birefringent interfaces of the polymer fiber 802 do not all lie exactly parallel to the x-axis. Accordingly, the light reflected or scattered by the composite fiber 802 may be scattered at different angles in the x-z plane. In the illustration, light 1102 is incident on the fiber 802 in a direction perpendicular to the x-axis, and a portion of the light 1102 is reflected through an angle, $\alpha$, with a component in the positive x-direction or negative x-direction, depending on whether the light 1102 is incident on the polymer fiber 802 at a "downslope" or "upslope". Thus, the polymer fiber 802 may also diffuse the reflected light in the x-z plane. The cone angle of the diffusely reflected light in the x-z plane depends on the shape of the composite fiber 802 within the weave: the more that portions of the fiber 802 depart from being parallel to the x-direction, the greater the angular distribution of the light in the x-z plane.

The optical element may be formed in a batch process or in a continuous process. In a continuous process, the fibers 802, preferably in a yarn, tow or weave, are laid onto the first polymer layer 804 and then the second polymer layer 806 may be continuously cast, or otherwise formed, over the fiber 802. The second polymer layer 806 may be infiltrated into the fiber 802 in an impregnation step. The second layer 806 may be then be cured or allowed to set.

The first polymer layer 804 may be a thermoplastic polymer or a thermoset-type polymer. The second and subsequent polymer layers 806, 808 can also be either thermoplastic or thermoset-type polymers. Thermoplastic polymers can be applied to the previous polymer layer 804 and infiltrated into the fibers 802 through a variety of methods including heat and pressure, solvent coating and drying, or in-situ polymerization. Thermoset-type polymers can be coated and cured onto the fibers 802 and previous polymer layers 804 and 806 through exposure to pressure, heat, actinic radiation, and/or elapsed time.

In an alternative approach to fabricating an element, a polymer film 804 having certain desirable optical, physical, or surface properties can be used as a substrate onto which the fibers 802 are laid. A thermoplastic or thermosetting resin or curable composition can be applied as the second polymer film 806 to infiltrate the layer or layers of fiber 802, and then a second substrate 808 can be applied to create a sandwich-type structure around the fibers 802 and the second polymer film 806 of the resin or curable composition. The curable resin can then be cured, hardened, or reacted to form a laminate. In this case the substrates 804, 808 can be made from the same materials as the thermoplastic, thermosetting resin or curable composition, or it can be made from different materials. A broad range of pressure sensitive adhesives and hot melt adhesives may be used in place of the thermoplastic or thermosetting resin or curable composition for the second layer 806. In some embodiments, the first and second substrates 804, 808 may be intimately attached to the thermoplastic or thermosetting resin or curable composition 806 containing the fibers 802. In other embodiments, the first and second substrates 804, 808 can be removable.

Figure 8C:
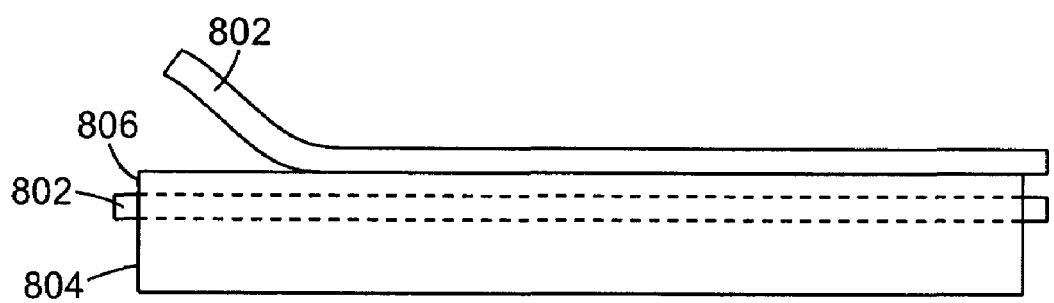
Figure 8D:
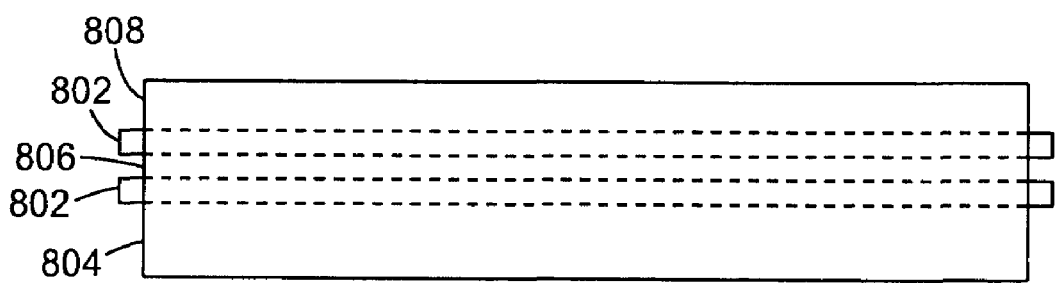

If desired, additional layers of composite fiber 802 may be added, along with subsequent layers of polymer material 808. For example, FIGS. 8C and 8D show the addition of a set of composite fibers 802 over the second polymer layer 806, and the application of a third polymer layer 808.

In another exemplary approach to fabricating an optical element having more than a single layer of birefringent fibers, two or more layers of fibers may be laid on top of a first polymer layer, and then a second layer of polymer material cast over the fibers as the polymer matrix in a single step.

In another exemplary method of fabricating a polarizer with composite fibers, the filler of the composite fibers may be removed, for example by dissolving in a solvent, before the composite fibers are embedded within the polymer matrix. The polymer matrix may then be used as the filler between the scattering fibers of the composite fiber. This method may be particularly useful when the composite fibers are provided in a yarn, a tow or a weave.

Suitable methods for producing composite fibers include extruding composite fibers with birefringent scattering fibers and a soluble filler. Suitable water soluble fillers include polyvinylpyrrolidinone, cellulose acetate, and polyvinyl alcohol. Suitable polyvinyl alcohol includes that made from polyvinylacetate that is hydrolyzed to a degree of about 70 to 95%.

The scattering fibers may be extruded in an array, oriented by heating the extruded array and applying suitable tension such that the scattering fibers are stretched to give a stretch ratio that results in the desired values of refractive index.

Oriented arrays of scattering fibers, forming the composite fibers, may be formed into yarns. The yarns may optionally also incorporate other types of fibers. The yarns are preferably oriented in a single direction by forming a tow of fibers or by weaving the fibers to form a fabric. The soluble polymer filler may be removed by washing the yarns at any stage of manufacture after extrusion.

The washed scattering fibers may be infiltrated with a fluid, preferably a curable resin fluid. Any suitable technique may be used to harden the resin, for example, the resin may be thermally and/or radiation cured, to form the matrix that contains the polymer fibers. In some exemplary embodiments, the resin is cured so that the matrix has flat surfaces. In other exemplary embodiments, the resin may be cured to have a desired structure on one or more surfaces. For example, the resin may be cured while it has a surface in contact with the microstructured surface of a microreplication tool. Examples of suitable microstructured surfaces include machined metal surfaces, electroformed replicas, or molded polymer films. Examples of suitable microstructures formed on the matrix surface include linear prismatic structures, non-linear prismatic structures, Fresnel surfaces, microlenses and the like.

Figure 12A:
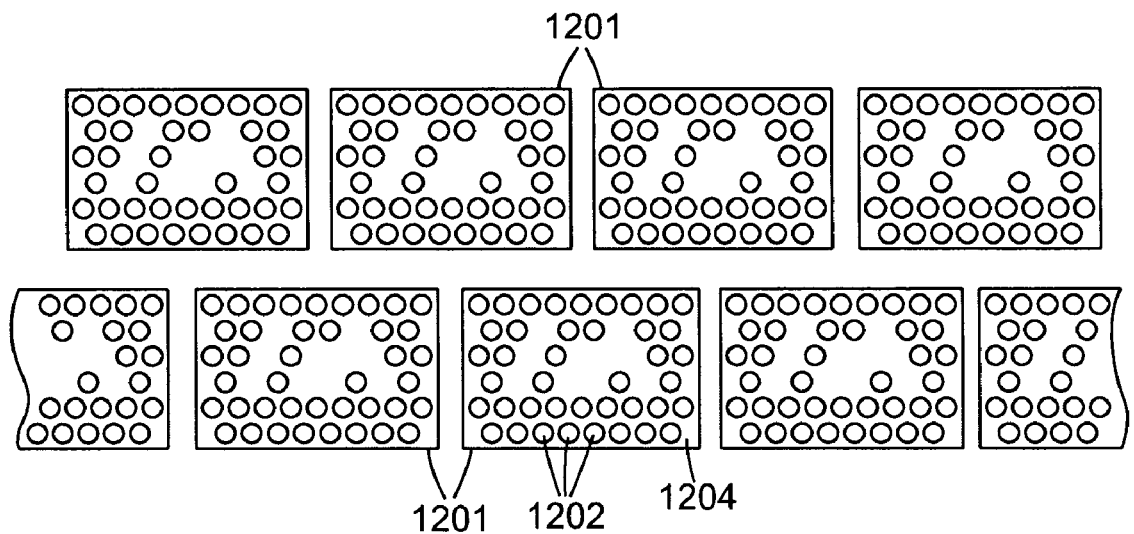
FIGS. 12A and 12B schematically illustrate embodiments of steps in fusing multiple composite fibers to form a fused composite fiber optical element, according to principles of the present invention.

Another approach to forming an optical element using composite fibers is now discussed with reference to FIGS. 12A and 12B. A number of separate composite fibers 1201 are shown in FIG. 12A. These fibers 1201 contain scattering fibers 1202 and a filler 1204 between the scattering fibers 1202. In the illustrated embodiment, the composite fibers 1201 have a rectangular cross-section and have the scattering fibers 1202 arranged in a specific, regular cross-sectional pattern that lacks symmetry. Other shapes of composite fibers 1201 may be used, for example round, elliptical, rectangular and the like, and other cross-sectional arrangements of scattering fibers 1202 may be used.

Figure 12B:
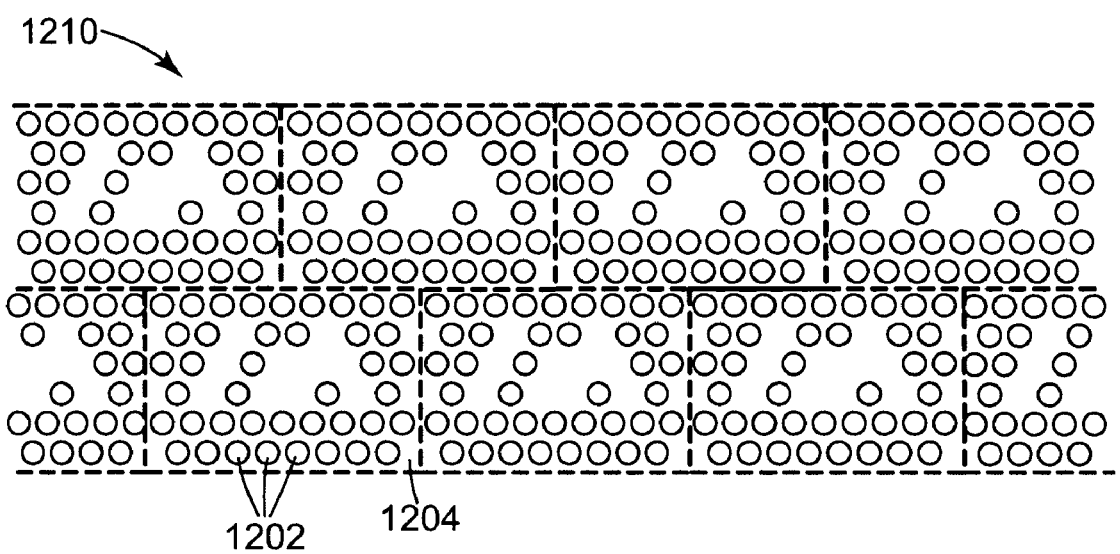

The fibers 1201 are fused together to form a single body 1210, for example as schematically illustrated in FIG. 12B. The dashed lines show where the boundaries between the fibers 1201 used to be before fusing. The fibers 1201 may be fused together using different methods. For example, the fibers 1201 may be fused together via the application of pressure and/or heat. When heat is applied to the fibers 1201, the temperature of the fibers 1201 need not reach the melting temperature of the polymeric materials of the fibers 1201, but need only reach a temperature sufficiently high to permit the fibers 1201 to adhere to each other. For example, the temperature may reach a value above the glass temperature, Tg, of the filler 1204, but below the melting temperature of at least one of the polymer components of the fiber 1201. In another approach, the fibers 1201 may be coated with, or the spaces between the fibers 1201 infiltrated with, a material that adheres the fibers 1201 together. Such a material might be, for example, a curable resin, such as an acrylate. It would be preferred for the refractive index of the adhering material to be close to the refractive index of the filler material of the composite fibers 1201. In another approach, the composite fibers 1201 may be treated with a solvent that makes the surface of the composite fibers 1201 tacky, with the result that the composite fibers 1201 adhere to each other through the application of pressure.

The fibers 1201 may be arranged as individual fibers before fusing, and they may be aligned parallel to each other (as illustrated) before fusing. In some approaches, the fibers 1201 need not be aligned parallel to each other before fusing. In other approaches, the fibers 1201 may be provided in yarn, tows or weaves before fusing. The individual yarn, tows or weaves may or may not be arranged in alignment with each other before fusing. The composite fibers 1201 may be stretched before or after fusing so as to orient the birefringent polymer.

One method of making a composite fiber is to coextrude multiple scattering fibers using feedblocks designed for manufacturing composite fibers. Such methods are discussed in greater detail in Handbook of Fiber Science and Technology: High Technology Fibers Part D, Vol. 3; Lewin and Preston (editors), Marcel Dekker, 1996, ISBN 0-8247-9470-2, incorporated by reference. Other fiber structures and cross-sectional distributions, including those described in this reference, may be used. The composite fibers may be stretched following extrusion to orient the birefringent material. The extrusion may be a reactive extrusion process, for example, as is commonly used with epoxies. In other approaches, the monomer may be extruded followed by a post-extrusion cure.

Some types of coextrusion feedblocks comprise a number of plates stacked together, where the plates have channels provided on one or both sides and/or apertures to permit the fluid polymer material to pass from one side of a plate to the other. The channels and apertures are designed so that, when the plates are stacked together, a small number of input ports at the inside lead through an increasing multiplicity of channels to the output side. The different output apertures are arranged so that the cross-section through the coextrudant at the output of the feedblock contains "islands" of the desired type of scattering fiber polymer material within a "sea" of the desired type of filler material. Feedblocks suitable for extruding scattering fibers within a composite fiber are discussed in greater detail in U.S. Patent Publication No. 2006/0193578, "COMPOSITE POLYMERIC OPTICAL FILMS WITH CO-CONTINUOUS PHASES", filed on even date herewith.

EXAMPLE

Figure 13:
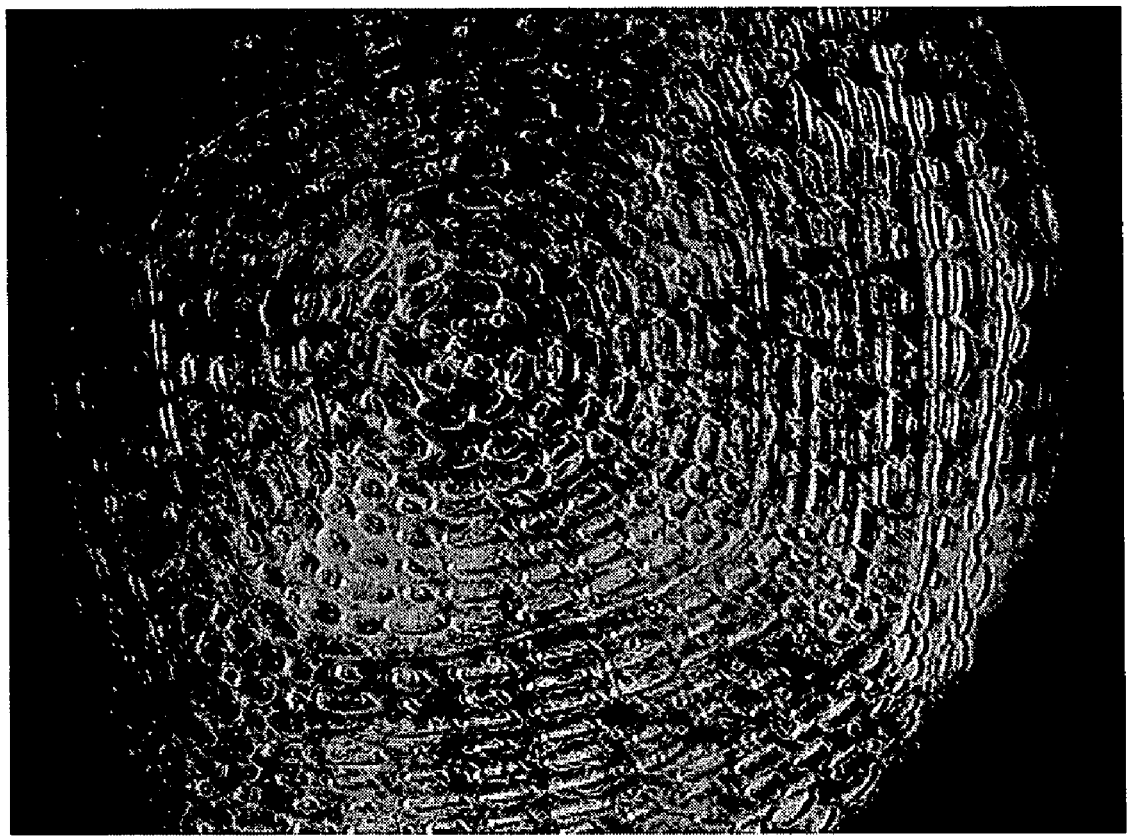
FIG. 13 presents a photograph of a cross-section through a coextruded composite fiber before stretching.

In an example of coextruding a composite fiber, a feedblock having one hundred and eighteen laser-machined plates and eleven end-milled plates, was assembled. The feedblock include two input ports and about 1000 "island" output ports. The feedblock was designed to achieve scattering fibers that have substantially equal polymer flow. A cross-section through the resulting coextrudant composite fiber is shown in the photograph in FIG. 13. The composite fiber comprised a PEN (90%)/PET (10%) copolymer as the scattering fiber "islands" in a filler "sea" of a PETG copolyester, Eastar™ 6763, supplied by Eastman Chemical Co., Kingsport, Tenn. The extruded composite fiber is about 200 μm in diameter. The composite fiber was not stretched but, with stretching while maintaining geometric shape, could reach a diameter of around 25 μm, i.e., a reduction in diameter of around 87%. At such a stretch, the spacing between the scattering fibers would be about 500 nm. The cross-sectional dimensions of the scattering fibers will depend on the ratio of the flow rates of the two different polymer materials.

Tows may be formed comprising thousands of such composite fibers approximately lying parallel to each other. These tows may be fused together by pressing together at an elevated temperature, for example, around 150° C., to form a fused sheet, in a manner like that described with reference to FIGS. 12A and 12B.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A photonic crystal fiber device, comprising: a composite polymer fiber comprising polymer scattering fibers disposed within a polymer filler, the polymer scattering fibers having a refractive index different from a refractive index of the polymer filler, the scattering fibers arranged in cross-section across the polymer fiber in a photonic crystal arrangement selected to provide desired spectral effects for light incident laterally on the composite polymer fiber, wherein at least one of the polymer filler and the scattering fibers comprises a birefringent polymer material.

2. A device as recited in claim 1, wherein the total cross-sectional areas of the scattering fibers comprise an area of about 20%-95% of the cross-sectional area of the composite fiber.

3. A device as recited in claim 1, wherein the total cross-sectional areas of the scattering fibers comprise an area of about 40%-90% of the cross-sectional area of the composite fiber.

4. A device as recited in claim 1, wherein the total cross-sectional areas of the scattering fibers comprise an area of about 50%-90% of the cross-sectional area of the composite fiber.

5. A photonic crystal fiber device, comprising: a polymer matrix; and composite polymer fibers disposed in the polymer matrix, the composite polymer fibers comprising polymer scattering fibers disposed within a polymer filler, the polymer scattering fibers having a refractive index different from a refractive index of the polymer filler, the scattering fibers in at least one composite fiber being arranged in cross-section across the at least one composite fiber in a photonic crystal arrangement selected to provide desired spectral effects for light incident laterally on the at least one composite fiber, wherein at least one of the polymer filler and the scattering fibers comprises a birefringent polymer material.

6. A device as recited in claim 5, further comprising a light source arranged to illuminate the at least one composite fiber laterally.

7. A device as recited in claim 5, wherein the polymer matrix comprises a structured surface.

8. A device as recited in claim 7, wherein the structured surface provides optical power to light passing through the structured surface.

9. A device as recited in claim 7, wherein the structured surface comprises a brightness enhancing surface structure.

10. A device as recited in claim 5, wherein at least some of the scattering fibers have a cross-sectional dimension within the range of about 50 nm-about 500 nm.

11. A photonic crystal fiber device, comprising: a polymer matrix; and composite polymer fibers disposed in the polymer matrix, the composite polymer fibers comprising polymer scattering fibers disposed within a polymer filler, the polymer scattering fibers having a refractive index different from a refractive index of the polymer filler, the scattering fibers in at least one composite fiber being arranged in cross-section across the at least one composite fiber in a photonic crystal arrangement selected to provide desired spectral effects for light incident laterally on the at least one composite fiber, wherein the polymer matrix comprises a structured surface, and wherein the structured surface comprises a brightness enhancing surface structure.

* * * * *

UNITED STATES PATENT AND TRADEMARK OFFICE
CERTIFICATE OF CORRECTION

PATENT NO. : 7,386,212 B2
APPLICATION NO. : 11/067848
DATED : June 10, 2008
INVENTOR(S) : Andrew J. Ouderkirk It is certified that error appears in the above-identified patent and that said Letters Patent is hereby corrected as shown below:

On the Title Page
Item [56], References Cited, FOREIGN PATENT DOCUMENTS, Below
"JP 2005-133028  5/2005" delete "WO 97/32224   9/1997". (Repeated Entry)

Item [56], References Cited, FOREIGN PATENT DOCUMENTS, Below
"WO9732224  *9/1997" delete "WO 99/64904   12/1999". (Repeated Entry)

Item [56], References Cited, FOREIGN PATENT DOCUMENTS, Below
"WO 03/062909  7/2003" delete "WO 2004/046777   6/2004". (Repeated Entry)

Item [56], References Cited, OTHER PUBLICATIONS, Delete "Hill" and insert
-- Hills --, therefor.

Item [56], References Cited, OTHER PUBLICATIONS, Delete "Microgibrillar" and insert -- Microfibrillar --, therefor.

Signed and Sealed this

Twenty-first Day of October, 2008

JON W. DUDAS
*Director of the United States Patent and Trademark Office*